(12) United States Patent
Melanson

(10) Patent No.: US 8,174,204 B2
(45) Date of Patent: *May 8, 2012

(54) LIGHTING SYSTEM WITH POWER FACTOR CORRECTION CONTROL DATA DETERMINED FROM A PHASE MODULATED SIGNAL

(75) Inventor: John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 847 days.

This patent is subject to a terminal disclaimer.

(21) Appl. No.: 12/047,269

(22) Filed: Mar. 12, 2008

(65) Prior Publication Data

US 2008/0224629 A1   Sep. 18, 2008

Related U.S. Application Data

(60) Provisional application No. 60/894,295, filed on Mar. 12, 2007, provisional application No. 60/909,458, filed on Apr. 1, 2007.

(51) Int. Cl.
*H05B 37/02* (2006.01)
(52) U.S. Cl. ......... 315/291; 315/224; 315/247; 315/307
(58) Field of Classification Search .............. 315/209 R, 315/224–226, 247, 291, 293, 294, 297, 307, 315/308, 316; 323/222, 283, 285; 363/15, 363/19, 21.01–21.13, 23
See application file for complete search history.

(56) References Cited

U.S. PATENT DOCUMENTS

| | | | |
|---|---|---|---|
| 3,316,495 A | 4/1967 | Sherer | |
| 3,423,689 A | 1/1969 | Miller et al. | |
| 3,586,988 A | 6/1971 | Weekes | |
| 3,725,804 A | 4/1973 | Langan | |
| 3,790,878 A | 2/1974 | Brokaw | |
| 3,881,167 A | 4/1975 | Pelton et al. | |
| 4,075,701 A | 2/1978 | Hofmann | |

(Continued)

FOREIGN PATENT DOCUMENTS

DE   19713814   10/1998

(Continued)

OTHER PUBLICATIONS

Linear Technology, "Single Switch PWM Controller with Auxiliary Boost Converter," LT1950 Datasheet, Linear Technology, Inc. Milpitas, CA, 2003.

(Continued)

*Primary Examiner* — Tung X Le
(74) *Attorney, Agent, or Firm* — Hamilton & Terrile, LLP; Kent B. Chambers

(57) ABSTRACT

A light emitting diode (LED) lighting system includes a power factor correction (PFC) controller that determines at least one power factor correction control parameter from phase delays of a phase modulated signal. In at least one embodiment, a peak voltage of the phase modulated signal is a PFC control parameter used bit the PFC controller to control power factor correction and generation of a link voltage by a PFC LED driver circuit. The phase delays are related to a peak voltage of the phase modulated signal. Thus, in at least one embodiment, detecting the phase delay in one or more cycles of the phase modulated signal allows the PFC controller to determine the peak voltage of the phase modulated signal.

32 Claims, 11 Drawing Sheets

U.S. PATENT DOCUMENTS

| | | | |
|---|---|---|---|
| 4,334,250 A | 6/1982 | Theus | |
| 4,409,476 A | 10/1983 | Lofgren et al. | |
| 4,414,493 A | 11/1983 | Henrich | |
| 4,476,706 A | 10/1984 | Hadden et al. | |
| 4,523,128 A | 6/1985 | Stamm | |
| 4,677,366 A | 6/1987 | Wilkinson et al. | |
| 4,683,529 A | 7/1987 | Bucher | |
| 4,700,188 A | 10/1987 | James | |
| 4,737,658 A | 4/1988 | Kronmuller et al. | |
| 4,797,633 A | 1/1989 | Humphrey | |
| 4,937,728 A | 6/1990 | Leonardi | |
| 4,940,929 A | 7/1990 | Williams | |
| 4,973,919 A | 11/1990 | Allfather | |
| 4,979,087 A | 12/1990 | Sellwood et al. | |
| 4,980,898 A | 12/1990 | Silvian | |
| 4,992,919 A | 2/1991 | Lee et al. | |
| 4,994,952 A | 2/1991 | Silva et al. | |
| 5,001,620 A | 3/1991 | Smith | |
| 5,055,746 A | 10/1991 | Hu et al. | |
| 5,109,185 A | 4/1992 | Ball | |
| 5,121,079 A | 6/1992 | Dargatz | |
| 5,206,540 A | 4/1993 | de Sa e Silva et al. | |
| 5,264,780 A | 11/1993 | Bruer et al. | |
| 5,278,490 A | 1/1994 | Smedley | |
| 5,323,157 A | 6/1994 | Ledzius et al. | |
| 5,359,180 A | 10/1994 | Park et al. | |
| 5,383,109 A | 1/1995 | Maksimovic et al. | |
| 5,424,932 A | 6/1995 | Inou et al. | |
| 5,477,481 A | 12/1995 | Kerth | |
| 5,479,333 A | 12/1995 | McCambridge et al. | |
| 5,481,178 A | 1/1996 | Wilcox et al. | |
| 5,565,761 A | 10/1996 | Hwang | |
| 5,589,759 A | 12/1996 | Borgato et al. | |
| 5,638,265 A | 6/1997 | Gabor | |
| 5,691,890 A | 11/1997 | Hyde | |
| 5,747,977 A | 5/1998 | Hwang | |
| 5,757,635 A | 5/1998 | Seong | |
| 5,764,039 A | 6/1998 | Choi et al. | |
| 5,768,111 A | 6/1998 | Zaitsu | |
| 5,781,040 A | 7/1998 | Myers | |
| 5,783,909 A | 7/1998 | Hochstein | |
| 5,798,635 A | 8/1998 | Hwang et al. | |
| 5,900,683 A | 5/1999 | Rinehart et al. | |
| 5,912,812 A | 6/1999 | Moriarty, Jr. | |
| 5,929,400 A | 7/1999 | Colby et al. | |
| 5,946,202 A | 8/1999 | Balogh | |
| 5,946,206 A | 8/1999 | Shimizu et al. | |
| 5,952,849 A | 9/1999 | Haigh et al. | |
| 5,960,207 A | 9/1999 | Brown | |
| 5,962,989 A | 10/1999 | Baker | |
| 5,963,086 A | 10/1999 | Hall | |
| 5,966,297 A | 10/1999 | Minegishi | |
| 5,994,885 A | 11/1999 | Wilcox et al. | |
| 6,016,038 A | 1/2000 | Mueller et al. | |
| 6,043,633 A | 3/2000 | Lev et al. | |
| 6,072,969 A | 6/2000 | Yokomori et al. | |
| 6,083,276 A | 7/2000 | Davidson et al. | |
| 6,084,450 A | 7/2000 | Smith et al. | |
| 6,091,233 A | 7/2000 | Hwang et al. | |
| 6,125,046 A | 9/2000 | Jang et al. | |
| 6,150,774 A | 11/2000 | Mueller et al. | |
| 6,181,114 B1 | 1/2001 | Hemena et al. | |
| 6,211,626 B1 | 4/2001 | Lys et al. | |
| 6,211,627 B1 | 4/2001 | Callahan | |
| 6,229,271 B1 | 5/2001 | Liu | |
| 6,229,292 B1 | 5/2001 | Redl et al. | |
| 6,246,183 B1 | 6/2001 | Buonavita | |
| 6,259,614 B1 | 7/2001 | Ribarich et al. | |
| 6,300,723 B1 | 10/2001 | Wang et al. | |
| 6,304,066 B1 | 10/2001 | Wilcox et al. | |
| 6,304,473 B1 | 10/2001 | Telefus et al. | |
| 6,343,026 B1 | 1/2002 | Perry | |
| 6,344,811 B1 | 2/2002 | Melanson | |
| 6,369,525 B1 | 4/2002 | Chang et al. | |
| 6,385,063 B1 | 5/2002 | Sadek et al. | |
| 6,407,514 B1 | 6/2002 | Glaser et al. | |
| 6,407,515 B1 | 6/2002 | Hesler | |
| 6,407,691 B1 | 6/2002 | Yu | |
| 6,441,558 B1 | 8/2002 | Muthu et al. | |
| 6,445,600 B2 | 9/2002 | Ben-Yaakov | |
| 6,452,521 B1 | 9/2002 | Wang | |
| 6,469,484 B2 | 10/2002 | L'Hermite et al. | |
| 6,495,964 B1 | 12/2002 | Muthu et al. | |
| 6,509,913 B2 | 1/2003 | Martin, Jr. et al. | |
| 6,531,854 B2 | 3/2003 | Hwang | |
| 6,580,258 B2 | 6/2003 | Wilcox et al. | |
| 6,583,550 B2 | 6/2003 | Iwasa et al. | |
| 6,628,106 B1 | 9/2003 | Batarseh et al. | |
| 6,636,003 B2 | 10/2003 | Rahm et al. | |
| 6,646,848 B2 | 11/2003 | Yoshida et al. | |
| 6,657,417 B1 | 12/2003 | Hwang | |
| 6,688,753 B2 | 2/2004 | Calon et al. | |
| 6,713,974 B2 | 3/2004 | Patchornik et al. | |
| 6,724,174 B1 | 4/2004 | Esteves et al. | |
| 6,727,832 B1 | 4/2004 | Melanson | |
| 6,737,845 B2 | 5/2004 | Hwang | |
| 6,741,123 B1 | 5/2004 | Melanson et al. | |
| 6,753,661 B2 | 6/2004 | Muthu et al. | |
| 6,756,772 B2 | 6/2004 | McGinnis | |
| 6,781,351 B2 | 8/2004 | Mednik et al. | |
| 6,788,011 B2 | 9/2004 | Mueller et al. | |
| 6,806,659 B1 | 10/2004 | Mueller et al. | |
| 6,839,247 B1 | 1/2005 | Yang | |
| 6,860,628 B2 | 3/2005 | Robertson et al. | |
| 6,870,325 B2 | 3/2005 | Bushell et al. | |
| 6,873,065 B2 | 3/2005 | Haigh et al. | |
| 6,882,552 B2 | 4/2005 | Telefus et al. | |
| 6,888,322 B2 | 5/2005 | Dowling et al. | |
| 6,894,471 B2 | 5/2005 | Corva et al. | |
| 6,933,706 B2 | 8/2005 | Shih | |
| 6,940,733 B2 | 9/2005 | Schie et al. | |
| 6,944,034 B1 | 9/2005 | Shteynberg et al. | |
| 6,956,750 B1 | 10/2005 | Eason et al. | |
| 6,958,920 B2 | 10/2005 | Mednik et al. | |
| 6,963,496 B2 | 11/2005 | Bimbaud | |
| 6,967,448 B2 | 11/2005 | Morgan et al. | |
| 6,970,503 B1 | 11/2005 | Kalb | |
| 6,975,079 B2 | 12/2005 | Lys et al. | |
| 6,975,523 B2 | 12/2005 | Kim et al. | |
| 6,980,446 B2 | 12/2005 | Simada et al. | |
| 7,003,023 B2 | 2/2006 | Krone et al. | |
| 7,034,611 B2 | 4/2006 | Oswal et al. | |
| 7,050,509 B2 | 5/2006 | Krone et al. | |
| 7,064,498 B2 | 6/2006 | Dowling et al. | |
| 7,064,531 B1 | 6/2006 | Zinn | |
| 7,072,191 B2 | 7/2006 | Nakao et al. | |
| 7,075,329 B2 | 7/2006 | Chen et al. | |
| 7,078,963 B1 | 7/2006 | Andersen et al. | |
| 7,088,059 B2 | 8/2006 | McKinney et al. | |
| 7,099,163 B1 | 8/2006 | Ying | |
| 7,102,902 B1 | 9/2006 | Brown et al. | |
| 7,106,603 B1 | 9/2006 | Lin et al. | |
| 7,109,791 B1 | 9/2006 | Epperson et al. | |
| 7,126,288 B2 | 10/2006 | Ribarich et al. | |
| 7,135,824 B2 | 11/2006 | Lys et al. | |
| 7,145,295 B1 * | 12/2006 | Lee et al. | 315/291 |
| 7,158,633 B1 | 1/2007 | Hein | |
| 7,161,816 B2 | 1/2007 | Shteynberg et al. | |
| 7,180,250 B1 | 2/2007 | Gannon | |
| 7,183,957 B1 | 2/2007 | Melanson | |
| 7,221,130 B2 | 5/2007 | Ribeiro et al. | |
| 7,233,135 B2 | 6/2007 | Noma et al. | |
| 7,246,919 B2 | 7/2007 | Porchia et al. | |
| 7,255,457 B2 | 8/2007 | Ducharm et al. | |
| 7,266,001 B1 | 9/2007 | Notohamiprodjo et al. | |
| 7,276,861 B1 | 10/2007 | Shteynberg et al. | |
| 7,288,902 B1 | 10/2007 | Melanson | |
| 7,292,013 B1 | 11/2007 | Chen et al. | |
| 7,310,244 B2 | 12/2007 | Yang et al. | |
| 7,345,458 B2 | 3/2008 | Kanai et al. | |
| 7,375,476 B2 | 5/2008 | Walter et al. | |
| 7,388,764 B2 | 6/2008 | Huynh et al. | |
| 7,394,210 B2 * | 7/2008 | Ashdown | 315/291 |
| 7,511,437 B2 | 3/2009 | Lys et al. | |
| 7,538,499 B2 | 5/2009 | Ashdown | |
| 7,545,130 B2 | 6/2009 | Latham | |
| 7,554,473 B2 | 6/2009 | Melanson | |

| | | |
|---|---|---|
| 7,569,996 B2 | 8/2009 | Holmes et al. |
| 7,583,136 B2 | 9/2009 | Pelly |
| 7,656,103 B2 | 2/2010 | Shteynberg et al. |
| 7,667,986 B2 | 2/2010 | Artusi et al. |
| 7,710,047 B2 * | 5/2010 | Shteynberg et al. .......... 315/291 |
| 7,719,246 B2 | 5/2010 | Melanson |
| 7,719,248 B1 | 5/2010 | Melanson |
| 7,746,043 B2 | 6/2010 | Melanson |
| 7,746,671 B2 | 6/2010 | Radecker et al. |
| 7,750,738 B2 | 7/2010 | Bach |
| 7,756,896 B1 | 7/2010 | Feingold |
| 7,777,563 B2 | 8/2010 | Midya et al. |
| 7,804,256 B2 * | 9/2010 | Melanson ................ 315/291 |
| 7,804,480 B2 | 9/2010 | Jeon et al. |
| 7,894,223 B2 * | 2/2011 | Sato et al. .................. 363/97 |
| 2002/0065583 A1 | 5/2002 | Okada |
| 2002/0145041 A1 | 10/2002 | Muthu et al. |
| 2002/0150151 A1 | 10/2002 | Krone et al. |
| 2002/0166073 A1 | 11/2002 | Nguyen et al. |
| 2003/0095013 A1 | 5/2003 | Melanson et al. |
| 2003/0174520 A1 | 9/2003 | Bimbaud |
| 2003/0223255 A1 | 12/2003 | Ben-Yaakov et al. |
| 2004/0004465 A1 | 1/2004 | McGinnis |
| 2004/0046683 A1 | 3/2004 | Mitamura et al. |
| 2004/0085030 A1 * | 5/2004 | Laflamme et al. ............ 315/291 |
| 2004/0085117 A1 | 5/2004 | Melbert et al. |
| 2004/0169477 A1 | 9/2004 | Yanai et al. |
| 2004/0227571 A1 | 11/2004 | Kuribayashi |
| 2004/0228116 A1 | 11/2004 | Miller et al. |
| 2004/0232971 A1 | 11/2004 | Kawasaki et al. |
| 2004/0239262 A1 | 12/2004 | Ido et al. |
| 2005/0156770 A1 | 7/2005 | Melanson |
| 2005/0168492 A1 * | 8/2005 | Hekstra et al. ................. 345/690 |
| 2005/0184895 A1 | 8/2005 | Petersen et al. |
| 2005/0197952 A1 | 9/2005 | Shea et al. |
| 2005/0207190 A1 | 9/2005 | Gritter |
| 2005/0218838 A1 | 10/2005 | Lys |
| 2005/0222881 A1 | 10/2005 | Booker |
| 2005/0253533 A1 | 11/2005 | Lys et al. |
| 2005/0270813 A1 | 12/2005 | Zhang et al. |
| 2005/0275354 A1 | 12/2005 | Hausman, Jr. et al. |
| 2005/0275386 A1 | 12/2005 | Jepsen et al. |
| 2006/0002110 A1 | 1/2006 | Dowling |
| 2006/0013026 A1 | 1/2006 | Frank et al. |
| 2006/0022916 A1 | 2/2006 | Aiello |
| 2006/0023002 A1 | 2/2006 | Hara et al. |
| 2006/0067521 A1 | 3/2006 | Muise |
| 2006/0116898 A1 | 6/2006 | Peterson |
| 2006/0125420 A1 | 6/2006 | Boone et al. |
| 2006/0184414 A1 | 8/2006 | Pappas et al. |
| 2006/0214603 A1 * | 9/2006 | Oh et al. .................. 315/246 |
| 2006/0226795 A1 | 10/2006 | Walter et al. |
| 2006/0238136 A1 | 10/2006 | Johnson, III et al. |
| 2006/0261754 A1 | 11/2006 | Lee |
| 2006/0285365 A1 | 12/2006 | Huynh et al. |
| 2007/0024213 A1 * | 2/2007 | Shteynberg et al. .......... 315/291 |
| 2007/0029946 A1 | 2/2007 | Yu et al. |
| 2007/0040512 A1 | 2/2007 | Jungwirth et al. |
| 2007/0053182 A1 | 3/2007 | Robertson |
| 2007/0055564 A1 | 3/2007 | Fourman |
| 2007/0124615 A1 | 5/2007 | Orr |
| 2007/0126656 A1 | 6/2007 | Huang et al. |
| 2007/0182347 A1 * | 8/2007 | Shteynberg et al. .......... 315/312 |
| 2007/0182699 A1 | 8/2007 | Ha et al. |
| 2007/0285031 A1 | 12/2007 | Shteynberg et al. |
| 2008/0012502 A1 * | 1/2008 | Lys ................. 315/247 |
| 2008/0018261 A1 | 1/2008 | Kastner |
| 2008/0027841 A1 | 1/2008 | Eder |
| 2008/0043504 A1 | 2/2008 | Ye et al. |
| 2008/0054815 A1 * | 3/2008 | Kotikalapoodi et al. ..... 315/192 |
| 2008/0116818 A1 | 5/2008 | Shteynberg et al. |
| 2008/0130322 A1 | 6/2008 | Artusi et al. |
| 2008/0130336 A1 | 6/2008 | Taguchi |
| 2008/0150433 A1 | 6/2008 | Tsuchida et al. |
| 2008/0154679 A1 | 6/2008 | Wade |
| 2008/0174291 A1 * | 7/2008 | Hansson et al. ............. 323/283 |
| 2008/0174372 A1 | 7/2008 | Tucker et al. |
| 2008/0175029 A1 | 7/2008 | Jung et al. |
| 2008/0192509 A1 | 8/2008 | Dhuyvetter et al. |
| 2008/0224635 A1 | 9/2008 | Hayes |
| 2008/0232141 A1 | 9/2008 | Artusi et al. |
| 2008/0239764 A1 | 10/2008 | Jacques et al. |
| 2008/0259655 A1 | 10/2008 | Wei et al. |
| 2008/0278132 A1 | 11/2008 | Kesterson et al. |
| 2009/0067204 A1 | 3/2009 | Ye et al. |
| 2009/0070188 A1 | 3/2009 | Scott et al. |
| 2009/0147544 A1 | 6/2009 | Melanson |
| 2009/0174479 A1 | 7/2009 | Yan et al. |
| 2009/0218960 A1 | 9/2009 | Lyons et al. |
| 2010/0141317 A1 | 6/2010 | Szajnowski |
| 2011/0121754 A1 * | 5/2011 | Shteynberg et al. .......... 315/294 |

FOREIGN PATENT DOCUMENTS

| | | |
|---|---|---|
| EP | 0585789 A1 | 3/1994 |
| EP | 0632679 | 1/1995 |
| EP | 0838791 | 4/1998 |
| EP | 0910168 A1 | 4/1999 |
| EP | 1014563 | 6/2000 |
| EP | 1164819 A | 12/2001 |
| EP | 1213823 A2 | 6/2002 |
| EP | 1460775 | 9/2004 |
| EP | 1528785 A | 5/2005 |
| EP | 08743813 | 3/2010 |
| EP | 2204905 A1 | 7/2010 |
| GB | 2069269 A | 8/1981 |
| WO | WO9725836 | 7/1997 |
| WO | 01/15316 A1 | 1/2001 |
| WO | 01/97384 A | 12/2001 |
| WO | 02/15386 A2 | 2/2002 |
| WO | 0227944 | 4/2002 |
| WO | 02/091805 A2 | 11/2002 |
| WO | WO2006013557 | 2/2006 |
| WO | 2006/067521 A | 6/2006 |
| WO | WO2006135584 | 12/2006 |
| WO | 2007/026170 A | 3/2007 |
| WO | 2007/079362 A | 7/2007 |
| WO | WO2008072160 | 6/2008 |
| WO | WO2008152838 | 12/2008 |

OTHER PUBLICATIONS

Yu, Zhenyu, 3.3V DSP for Digital Motor Control, Texas Instruments, Application Report SPRA550 dated Jun. 1999.
International Rectifier, Data Sheet No. PD60143-O, Current Sensing Single Channel Driver, El Segundo, CA, dated Sep. 8, 2004.
Balogh, Laszlo, "Design and Application Guide for High Speed MOSFET Gate Drive Circuits" [Online] 2001, Texas Instruments, Inc., SEM-1400, Unitrode Power Supply Design Seminar, Topic II, TI literature No. SLUP133, XP002552367, Retrieved from the Internet: URL:htt'://focus.ti.com/lit/ml/slup169/slup169.pdf the whole document.
PCT US2008/056739 International Preliminary Report on Patentability and Written Opinion dated Sep. 15, 2009.
An-H52 Application Note: "HV9931 Unity Power Factor LED Lamp Driver" Mar. 7, 2007, Supertex Inc., Sunnyvale, CA, USA.
ST Datasheet L6562, Transition-Mode PFC Controller, 2005, STMicroelectronics, Geneva, Switzerland.
Maksimovic, Regan Zane and Robert Erickson, Impact of Digital Control in Power Electronics, Proceedings of 2004 International Symposium on Power Semiconductor Devices & Ics, Kitakyushu,, Apr. 5, 2010, Colorado Power Electronics Center, ECE Department, University of Colorado, Boulder, CO.
Infineon, CCM-PFC Standalone Power Factor Correction (PFC) Controller in Continuous Conduction Mode (CCM), Version 2.1, Feb. 6, 2007.
International Rectifier, IRAC1150-300W Demo Board, User's Guide, Rev 3.0, Aug. 2, 2005.
International Rectifier, Application Note AN-1077,PFC Converter Design with IR1150 One Cycle Control IC, rev. 2.3, Jun. 2005.
International Rectifier, Data Sheet PD60230 revC, Feb. 5, 2007.
Lu et al., International Rectifier, Bridgeless PFC Implementation Using One Cycle Control Technique, 2005.
Linear Technology, LT1248, Power Factor Controller, Apr. 20, 2007.
On Semiconductor, AND8123/D, Power Factor Correction Stages Operating in Critical Conduction Mode, Sep. 2003.

On Semiconductor, MC33260, GreenLine Compact Power Factor Controller: Innovative Circuit for Cost Effective Solutions, Sep. 2005.
On Semiconductor, NCP1605, Enhanced, High Voltage and Efficient Standby Mode, Power Factor Controller, Feb. 2007.
On Semconductor, NCP1606, Cost Effective Power Factor Controller, Mar. 2007.
On Semiconductor, NCP1654, Product Review, Power Factor Controller for Compact and Robust, Continuous Conduction Mode Pre-Converters, Mar. 2007.
Philips, Application Note, 90W Resonant SMPS with TEA1610 SwingChip, AN99011, 1999.
NXP, TEA1750, GreenChip III SMPS control IC Product Data Sheet, Apr. 6, 2007.
Renesas, HA16174P/FP, Power Factor Correction Controller IC, Jan. 6, 2006.
Renesas Technology Releases Industry's First Critical-Conduction-Mode Power Factor Correction Control IC Implementing Interleaved Operation, Dec. 18, 2006.
Renesas, Application Note R2A20111 EVB, PFC Control IC R2A20111 Evaluation Board, Feb. 2007.
STMicroelectronics, L6563, Advanced Transition-Mode PFC Controller, Mar. 2007.
Texas Instruments, Application Note SLUA321, Startup Current Transient of the Leading Edge Triggered PFC Controllers, Jul. 2004.
Texas Instruments, Application Report, SLUA309A, Avoiding Audible Noise at Light Loads when using Leading Edge Triggered PFC Converters, Sep. 2004.
Texas Instruments, Application Report SLUA369B, 350-W, Two-Phase Interleaved PFC Pre-Regulator Design Review, Mar. 2007.
Unitrode, High Power-Factor Preregulator, Oct. 1994.
Texas Instruments, Transition Mode PFC Controller, SLUS515D, Jul. 2005.
Unitrode Products From Texas Instruments, Programmable Output Power Factor Preregulator, Dec. 2004.
Unitrode Products From Texas Instruments, High Performance Power Factor Preregulator, Oct. 2005.
Texas Instruments, UCC3817 BiCMOS Power Factor Preregulator Evaluation Board User's Guide, Nov. 2002.
Unitrode, L. Balogh, Design Note UC3854A/B and UC3855A/B Provide Power Limiting with Sinusoidal Input Current for PFC Front Ends, SLUA196A, Nov. 2001.
A. Silva De Morais et al., A High Power Factor Ballast Using a Single Switch with Both Power Stages Integrated, IEEE Transactions on Power Electronics, vol. 21, No. 2, Mar. 2006.
M. Ponce et al., High-Efficient Integrated Electronic Ballast for Compact Fluorescent Lamps, IEEE Transactions on Power Electronics, vol. 21, No. 2, Mar. 2006.
A. R. Seidel et al., A Practical Comparison Among High-Power-Factor Electronic Ballasts with Similar Ideas, IEEE Transactions on Industry Applications, vol. 41, No. 6, Nov.-Dec. 2005.
F. T. Wakabayashi et al., An Improved Design Procedure for LCC Resonant Filter of Dimmable Electronic Ballasts for Fluorescent Lamps, Based on Lamp Model, IEEE Transactions on Power Electronics, vol. 20, No. 2, Sep. 2005.
J. A. Vilela Jr. et al., An Electronic Ballast with High Power Factor and Low Voltage Stress, IEEE Transactions on Industry Applications, vol. 41, No. 4, Jul./Aug. 2005.
S. T.S. Lee et al., Use of Saturable Inductor to Improve the Dimming Characteristics of Frequency-Controlled Dimmable Electronic Ballasts, IEEE Transactions on Power Electronics, vol. 19, No. 6, Nov. 2004.
M. K. Kazimierczuk et al., Electronic Ballast for Fluorescent Lamps, IEEETransactions on Power Electronics, vol. 8, No. 4, Oct. 1993.
S. Ben-Yaakov et al., Statics and Dynamics of Fluorescent Lamps Operating at High Frequency: Modeling and Simulation, IEEE Transactions on Industry Applications, vol. 38, No. 6, Nov.-Dec. 2002.
H. L. Cheng et al., A Novel Single-Stage High-Power-Factor Electronic Ballast with Symmetrical Topology, IEEE Transactions on Power Electronics, vol. 50, No. 4, Aug. 2003.

J.W.F. Dorleijn et al., Standardisation of the Static Resistances of Fluorescent Lamp Cathodes and New Data for Preheating, Industry Applications Conference, vol. 1, Oct. 13, 2002-Oct. 18, 2002.
Q. Li et al., An Analysis of the ZVS Two-Inductor Boost Converter under Variable Frequency Operation, IEEE Transactions on Power Electronics, vol. 22, No. 1, Jan. 2007.
H. Peng et al., Modeling of Quantization Effects in Digitally Controlled DC-DC Converters, IEEE Transactions on Power Electronics, vol. 22, No. 1, Jan. 2007.
G. Yao et al., Soft Switching Circuit for Interleaved Boost Converters, IEEE Transactions on Power Electronics, vol. 22, No. 1, Jan. 2007.
C. M. De Oliviera Stein et al., A ZCT Auxiliary Communication Circuit for Interleaved Boost Converters Operating in Critical Conduction Mode, IEEE Transactions on Power Electronics, vol. 17, No. 6, Nov. 2002.
W. Zhang et al., A New Duty Cycle Control Strategy for Power Factor Correction and FPGA Implementation, IEEE Transactions on Power Electronics, vol. 21, No. 6, Nov. 2006.
H. Wu et al., Single Phase Three-Level Power Factor Correction Circuit with Passive Lossless Snubber, IEEE Transactions on Power Electronics, vol. 17, No. 2, Mar. 2006.
O. Garcia et al., High Efficiency PFC Converter to Meet EN61000-3-2 and A14, Proceedings of the 2002 IEEE International Symposium on Industrial Electronics, vol. 3, 2002.
P. Lee et al., Steady-State Analysis of an Interleaved Boost Converter with Coupled Inductors, IEEE Transactions on Industrial Electronics, vol. 47, No. 4, Aug. 2000.
D.K.W. Cheng et al., A New Improved Boost Converter with Ripple Free Input Current Using Coupled Inductors, Power Electronics and Variable Speed Drives, Sep. 21-23, 1998.
B.A. Miwa et al., High Efficiency Power Factor Correction Using Interleaved Techniques, Applied Power Electronics Conference and Exposition, Seventh Annual Conference Proceedings, Feb. 23-27, 1992.
Z. Lai et al., A Family of Power-Factor-Correction Controllers, Twelfth Annual Applied Power Electronics Conference and Exposition, vol. 1, Feb. 23, 1997-Feb. 27, 1997.
L. Balogh et al., Power-Factor Correction with Interleaved Boost Converters in Continuous-Inductor-Current Mode, Eighth Annual Applied Power Electronics Conference and Exposition, 1993. APEC '93. Conference Proceedings, Mar. 7, 1993-Mar. 11, 1993.
Fairchild Semiconductor, Application Note 42030, Theory and Application of the ML4821 Average Current Mode PFC Controller, Oct. 25, 2000.
Unitrode Products From Texas Instruments, BiCMOS Power Factor Preregulator, Feb. 2006.
International Search Report and Written Opinion for PCT/US2008/062384 dated Jan. 14, 2008.
S. Dunlap et al., Design of Delta-Sigma Modulated Switching Power Supply, Circuits & Systems, Proceedings of the 1998 IEEE International Symposium, 1998.
Texas Instruments, Interleaving Continuous Conduction Mode PFC Controller, UCC28070, SLUS794C, Nov. 2007, revised Jun. 2009, Texas Instruments, Dallas TX.
Power Integrations, Inc., "TOP200-4/14 TOPSwitch Family Three-terminal Off-line PWM Switch", XP-002524650, Jul. 1996, Sunnyvale, California.
Texas Instruments, SLOS318F, "High-Speed, Low Noise, Fully-Differential I/O Amplifiers," THS4130 and THS4131, US, Jan. 2006.
International Search Report and Written Opinion, PCT US20080062398, dated Feb. 5, 2008.
International Search Report Written Opinion PCT US2008051072, dated Feb. 19, 2007.
International Search Report and Written Opinion, PCT US20080062387, dated Feb. 5, 2008.
International Search Report and Written Opinion, PCT US200900032358, dated Jan. 29, 2009.
Hirota, Atsushi et al, "Analysis of Single Switch Delta-Sigma Modulated Pulse Space Modulation PFC Converter Effectively Using Switching Power Device," IEEE, US, 2002.
Prodic, Aleksandar, "Digital Controller for High-Frequency Rectifiers with Power Factor Correction Suitable for On-Chip Implementation," IEEE, US, 2007.

International Search Report and Written Opinion, PCT US20080062378, dated Feb. 5, 2008.
International Search Report and Written Opinion, PCT US20090032351, dated Jan. 29, 2009.
Erickson, Robert W. et al, "Fundamentals of Power Electronics," Second Edition, Chapter 6, Boulder, CO, 2001.
Allegro Microsystems, A1442, "Low Voltage Full Bridge Brushless DC Motor Driver with Hall Commutation and Soft-Switching, and Reverse Battery, Short Circuit, and Thermal Shutdown Protection," Worcester MA, 2009.
Texas Instruments, SLUS828B, "8-Pin Continuous Conduction Mode (CCM) PFC Controller", UCC28019A, US, revised Apr. 2009.
Analog Devices, "120 kHz Bandwidth, Low Distortion, Isolation Amplifier", AD215, Norwood, MA, 1996.
Burr-Brown, ISO120 and ISO121, "Precision Los Cost Isolation Amplifier," Tucson AZ, Mar. 1992.
Burr-Brown, ISO130, "High IMR, Low Cost Isolation Amplifier," SBOS220, US, Oct. 2001.
State Intellectual Property Office of P.R.C., Notification of the First Office Action in corresponding Chinese Application No. 200880008121.3, mailed Aug. 26, 2010, along with English translation, 17 pages.
Written Opinion of the International Searching Authority PCT/US2008/056739 dated Dec. 3, 2008.
International Search Report PCT/US2008/062387 dated Jan. 10, 2008.
Data Sheet LT3496 Triple Output LED Driver, Linear Technology Corporation, Milpitas, CA 2007.
Linear Technology, News Release,Triple Output LED, LT3496, Linear Technology, Milpitas, CA, May 24, 2007.
Mamano, Bob, "Current Sensing Solutions for Power Supply Designers", Unitrode Seminar Notes SEM1200, 1999.
http://toolbarpdf.com/docs/functions-and-features-of-inverters.html printed on Jan. 20, 2011.
Response to Office Action, 1787-EP, Jan. 17, 2011.
Freescale Semiconductor, Inc., Dimmable Light Ballast with Power Factor Correction, Design Reference Manual, DRM067, Rev. 1, Dec. 2005.
J. Zhou et al., Novel Sampling Algorithm for DSP Controlled 2 kW PFC Converter, IEEE Transactions on Power Electronics, vol. 16, No. 2, Mar. 2001.
A. Prodic, Compensator Design and Stability Assessment for Fast Voltage Loops of Power Factor Correction Rectifiers, IEEE Transactions on Power Electronics, vol. 22, No. 5, Sep. 2007.
M. Brkovic et al., "Automatic Current Shaper with Fast Output Regulation and Soft-Switching," S.15.C Power Converters, Telecommunications Energy Conference, 1993.
Dallas Semiconductor, Maxim, "Charge-Pump and Step-Up DC-DC Converter Solutions for Powering White LEDs in Series or Parallel Connections," Apr. 23, 2002.
Freescale Semiconductor, AN3052, Implementing PFC Average Current Mode Control Using the MC9S12E128, Nov. 2005.
D. Maksimovic et al., "Switching Converters with Wide DC Conversion Range," Institute of Electrical and Electronic Engineer's (IEEE) Transactions on Power Electronics, Jan. 1991.
V. Nguyen et al., "Tracking Control of Buck Converter Using Sliding-Mode with Adaptive Hysteresis," Power Electronics Specialists Conference, 1995. PESC apos; 95 Record., 26th Annual IEEE vol. 2, Issue , Jun. 18-22, 1995 pp. 1086-1093.
S. Zhou et al., "A High Efficiency, Soft Switching DC-DC Converter with Adaptive Current-Ripple Control for Portable Applications," IEEE Transactions on Circuits and Systems—II: Express Briefs, vol. 53, No. 4, Apr. 2006.
K. Leung et al., "Use of State Trajectory Prediction in Hysteresis Control for Achieving Fast Transient Response of the Buck Converter," Circuits and Systems, 2003. ISCAS apos;03. Proceedings of the 2003 International Symposium, vol. 3, Issue , May 25-28, 2003 pp. III-439-III-442 vol. 3.
K. Leung et al., "Dynamic Hysteresis Band Control of the Buck Converter with Fast Transient Response," IEEE Transactions on Circuits and Systems—II: Express Briefs, vol. 52, No. 7, Jul. 2005.

Y. Ohno, Spectral Design Considerations for White LED Color Rendering, Final Manuscript, Optical Engineering, vol. 44, 111302 (2005).
S. Skogstad et al., A Proposed Stability Characterization and Verification Method for High-Order Single-Bit Delta-Sigma Modulators, Norchip Conference, Nov. 2006 http://folk.uio.no/sayskogs/pub/A_Proposed_Stability_Characterization.pdf.
J. Turchi, Four Key Steps to Design a Continuous Conduction Mode PFC Stage Using the NCP1653, ON Semiconductor, Publication Order No. AND184/D, Nov. 2004.
Megaman, D or S Dimming ESL, Product News, Mar. 15, 2007.
J. Qian et al., New Charge Pump Power-Factor-Correction Electronic Ballast with a Wide Range of Line Input Voltage, IEEE Transactions on Power Electronics, vol. 14, No. 1, Jan. 1999.
P. Green, A Ballast that can be Dimmed from a Domestic (Phase-Cut) Dimmer, IRPLCFL3 rev. b, International Rectifier, http://www.irf.com/technical-info/refdesigns/cfl-3.pdf, printed Mar. 24, 2007.
J. Qian et al., Charge Pump Power-Factor-Correction Technologies Part II: Ballast Applications, IEEE Transactions on Power Electronics, vol. 15, No. 1, Jan. 2000.
Chromacity Shifts in High-Power White LED Systems due to Different Dimming Methods, Solid-State Lighting, http://www.lrc.rpi.edu/programs/solidstate/completedProjects.asp?ID=76, printed May 3, 2007.
S. Chan et al., Design and Implementation of Dimmable Electronic Ballast Based on Integrated Inductor, IEEE Transactions on Power Electronics, vol. 22, No. 1, Jan. 2007.
M. Madigan et al., Integrated High-Quality Rectifier-Regulators, IEEE Transactions on Industrial Electronics, vol. 46, No. 4, Aug. 1999.
T. Wu et al., Single-Stage Electronic Ballast with Dimming Feature and Unity Power Factor, IEEE Transactions on Power Electronics, vol. 13, No. 3, May 1998.
F. Tao et al., "Single-Stage Power-Factor-Correction Electronic Ballast with a Wide Continuous Dimming Control for Fluorescent Lamps," IEEE Power Electronics Specialists Conference, vol. 2, 2001.
Azoteq, IQS17 Family, IQ Switch®—ProxSense™ Series, Touch Sensor, Load Control and User Interface, IQS17 Datasheet V2.00.doc, Jan. 2007.
C. Dilouie, Introducing the LED Driver, EC&M, Sep. 2004.
S. Lee et al., TRIAC Dimmable Ballast with Power Equalization, IEEE Transactions on Power Electronics, vol. 20, No. 6, Nov. 2005.
L. Gonthier et al., EN55015 Compliant 500W Dimmer with Low-Losses Symmetrical Switches, 2005 European Conference on Power Electronics and Applications, Sep. 2005.
D. Hausman, Real-Time Illumination Stability Systems for Trailing-Edge (Reverse Phase Control) Dimmers, Technical White Paper, Lutron, version 1.0, Dec. 2004, http://www.lutron.com/technical_info/pdf/RTISS-TE.pdf.
Light Dimmer Circuits, www.epanorama.net/documents/lights/lightdimmer.html, printed Mar. 26, 2007.
Light Emitting Diode, http://en.wikipedia.org/wiki/Light-emitting_diode, printed Mar. 27, 2007.
Color Temperature, www.sizes.com/units/color_temperature.htm, printed Mar. 27, 2007.
S. Lee et al., A Novel Electrode Power Profiler for Dimmable Ballasts Using DC Link Voltage and Switching Frequency Controls, IEEE Transactions on Power Electronics, vol. 19, No. 3, May 2004.
Y. Ji et al., Compatibility Testing of Fluorescent Lamp and Ballast Systems, IEEE Transactions on Industry Applications, vol. 35, No. 6, Nov./Dec. 1999.
National Lighting Product Information Program, Specifier Reports, "Dimming Electronic Ballasts," vol. 7, No. 3, Oct. 1999.
Supertex Inc., Buck-based LED Drivers Using the HV9910B, Application Note AN-H48, Dec. 28, 2007.
D. Rand et al., Issues, Models and Solutions for Triac Modulated Phase Dimming of LED Lamps, Power Electronics Specialists Conference, 2007.
Supertex Inc., HV9931 Unity Power Factor LED Lamp Driver, Application Note AN-H52, Mar. 7, 2007.
Supertex Inc., 56W Off-line LED Driver, 120VAC with PFC, 160V, 350mA Load, Dimmer Switch Compatible, DN-H05, Feb. 2007.

St Microelectronics, Power Factor Corrector L6561, Jun. 2004.
Fairchild Semiconductor, Application Note 42047 Power Factor Correction (PFC) Basics, Rev. 0.9.0 Aug. 19, 2004.
M. Radecker et al., Application of Single-Transistor Smart-Power IC for Fluorescent Lamp Ballast, Thirty-Fourth Annual Industry Applications Conference IEEE, vol. 1, Oct. 3, 1999-Oct. 7, 1999.
M. Rico-Secades et al., Low Cost Electronic Ballast for a 36-W Fluorescent Lamp Based on a Current-Mode-Controlled Boost Inverter for a 120-V DC Bus Power Distribution, IEEE Transactions on Power Electronics, vol. 21, No. 4, Jul. 2006.
Fairchild Semiconductor, FAN4800, Low Start-up Current PFC/PWM Controller Combos, Nov. 2006.
Fairchild Semiconductor, FAN4810, Power Factor Correction Controller, Sep. 24, 2003.
Fairchild Semiconductor, FAN4822, ZVS Average Current PFC Controller, Aug. 10, 2001.
Fairchild Semiconductor, FAN7527B, Power Factor Correction Controller, 2003.
Fairchild Semiconductor, ML4821, Power Factor Controller, Jun. 19, 2001.
Freescale Semiconductor, AN1965, Design of Indirect Power Factor Correction Using 56F800/E, Jul. 2005.
International Search Report for PCT/US2008/051072, mailed Jun. 4, 2008.
D. Hausman, Lutron, RTISS-TE Operation, Real-Time Illumination Stability Systems for Trailing-Edge (Reverse Phase Control) Dimmers, v. 1.0 Dec. 2004.
International Rectifier, Data Sheet No. PD60230 revC, IR1150(S)(PbF), uPFC One Cycle Control PFC IC Feb. 5, 2007.
Texas Instruments, Application Report SLUA308, UCC3817 Current Sense Transformer Evaluation, Feb. 2004.
Texas Instruments, Application Report SPRA902A, Average Current Mode Controlled Power Factor Correctiom Converter using TMS320LF2407A, Jul. 2005.
Unitrode, Design Note DN-39E, Optimizing Performance in UC3854 Power Factor Correction Applications, Nov. 1994.
Fairchild Semiconductor, Application Note 42030, Theory and Application of the ML4821 Average Currrent Mode PFC Controller, Aug. 1997.
Fairchild Semiconductor, Application Note AN4121, Design of Power Factor Correction Circuit Using FAN7527B, Rev.1.0.1, May 30, 2002.
Fairchild Semiconductor, Application Note 6004, 500W Power-Factor-Corrected (PFC) Converter Design with FAN4810, Rev. 1.0.1, Oct. 31, 2003.
Fairchild Semiconductor, FAN4822, ZVA Average Current PFC Controller, Rev. 1.0.1 Aug. 10, 2001.
Fairchild Semiconductor, ML4821, Power Factor Controller, Rev. 1.0.2, Jun. 19, 2001.
Fairchild Semiconductor, ML4812, Power Factor Controller, Rev. 1.0.4, May 31, 2001.
Fairchild Semiconductor, FAN7544, Simple Ballast Controller, Rev. 1.0.0.
Fairchild Semiconductor, FAN7532, Ballast Controller, Rev. 1.0.2.
Fairchild Semiconductor, FAN7711, Ballast Control IC, Rev. 1.0.2.
Fairchild Semiconductor, KA7541, Simple Ballast Controller, Rev. 1.0.3.
ST Microelectronics, L6574, CFL/TL Ballast Driver Preheat and Dimming, Sep. 2003.
ST Microelectronics, AN993, Application Note, Electronic Ballast with PFC Using L6574 and L6561, May 2004.
"HV9931 Unity Power Factor LED Lamp Driver, Initial Release" 2005, Supertex Inc., Sunnyvale, CA USA.
"AN-H52 Application Note: "HV9931 Unity Power Factor LED Lamp Driver Mar. 7, 2007, Supertex Inc., Sunnyvale, CA, USA.
Dustin Rand et al: "Issues, Models and Solutions for Triac Modulated Phase Dimming of LED Lamps" Power Electronics Specialists Conference, 2007. PESC 2007, IEEE, IEEE, p. 1, Jun. 1, 2007, pp. 1398-1404.
Spiazzi G et al: "Analysis of a High-Power-Factor Electronic Ballast for High Brightness Light Emitting Diodes" Power Electronics Specialists, 2005 IEEE 36th Conference on Jun. 12, 2005, Piscatawa, NJ USA, IEEE, Jun. 12, 2005, pp. 1494-1499.
International Search Report PCT/US2008/062381 dated Feb. 5, 2008.
International Search Report PCT/US2008/056739 dated Dec. 3, 2008.
Written Opinion of the International Searching Authority PCT/US2008/062381 dated Feb. 5, 2008.
Ben-Yaakov et al, "The Dynamics of a PWM Boost Converter with Resistive Input" IEEE Transactions on Industrial Electronics, IEEE Service Center, Piscataway, NJ, USA, vol. 46, No. 3, Jun. 1, 1999.
International Search Report PCT/US2008/062398 dated Feb. 5, 2008.
Partial International Search PCT/US2008/062387 dated Feb. 5, 2008.
Noon, Jim "UC3855A/B High Performance Power Factor Preregulator", Texas Instruments, SLUA146A, May 1996, Revised Apr. 2004.
"High Performance Power Factor Preregulator", Unitrode Products from Texas Instruments, SLUS382B, Jun. 1998, Revised Oct. 2005.
International Search Report PCT/GB2006/003259 dated Jan. 12, 2007.
Written Opinion of the International Searching Authority PCT/US2008/056739.
International Search Report PCT/US2008/056606 dated Dec. 3, 2008.
Written Opinion of the International Searching Authority PCT/US2008/056606 dated Dec. 3, 2008.
International Search Report PCT/US2008/056608 dated Dec. 3, 2008.
Written Opinion of the International Searching Authority PCT/US2008/056608 dated Dec. 3, 2008.
International Search Report PCT/GB2005/050228 dated Mar. 14, 2006.
International Search PCT/US2008/062387 dated Jan. 10, 2008.
Data Sheet LT3496 Triple Output LED Driver, 2007, Linear Technology Corporation, Milpitas, CA.

* cited by examiner

US 8,174,204 B2

LIGHTING SYSTEM WITH POWER FACTOR CORRECTION CONTROL DATA DETERMINED FROM A PHASE MODULATED SIGNAL

CROSS REFERENCE TO RELATED APPLICATIONS

This application claims the benefit under 35 U.S.C. §119(e) and 37 C.F.R. §1.78 of U.S. Provisional Application No. 60/894,295, filed Mar. 12, 2007 and entitled "Lighting Fixture." U.S. Provisional Application No. 60/894,295 includes exemplary systems and methods and is incorporated by reference in its entirety.

This application claims the benefit under 35 U.S.C. §119(e) and 37 C.F.R. §1.78 of U.S. Provisional Application No. 60/909,458, entitled "Ballast for Light Emitting Diode Light Sources," inventor John L. Melanson, and filed on Apr. 1, 2007 describes exemplary methods and systems and is incorporated by reference in its entirety.

U.S. patent application Ser. No. 12/047,249, entitled "Ballast for Light Emitting Diode Light Sources," inventor John L. Melanson, and filed on Mar. 12, 2008 describes exemplary methods and systems and is incorporated by reference in its entirety.

U.S. patent application Ser. No. 11/926,864, entitled "Color Variations in a Dimmable Lighting Device with Stable Color Temperature Light Sources," inventor John L. Melanson, and filed on Mar. 31, 2007 describes exemplary methods and systems and is incorporated by reference in its entirely. Referred to herein as Melanson I.

U.S. Provisional Application No. 60/909,457, entitled "Multi-Function Duty Cycle Modifier," inventors John L. Melanson and John Paulos, and filed on Mar. 31, 2007 describes exemplary methods and systems and is incorporated by reference in its entirety. Referred to herein as Melanson II.

U.S. patent application Ser. No. 12/047,258, entitled "Multi-Function Duty Cycle Modifier." inventors John L. Melanson and John Paulos, and filed on Mar. 12, 2008 describes exemplary methods and systems and is incorporated by reference in its entirety. Referred to herein as Melanson III.

U.S. patent application Ser. No. 11/695,024, entitled "Lighting System with Lighting Dimmer Output Mapping," inventors John L. Melanson and John Paulos, and filed on Mar. 31, 2007 describes exemplary methods and systems and is incorporated by reference in its entirety.

U.S. patent application Ser. No. 11/864,366, entitled "Time-Based Control of a System having Integration Response," inventor John L. Melanson, and filed on Sep. 28, 2007 describes exemplary methods and systems and is incorporated by reference in its entirety. Referred to herein as Melanson IV.

U.S. patent application Ser. No. 11/967,269, entitled "Power Control System Using a Nonlinear Delta-Sigma Modulator with Nonlinear Power Conversion Process Modeling," inventor John L. Melanson, and filed on Dec. 31, 2007 describes exemplary methods and systems and is incorporated by reference in its entirety. Referred to herein as Melanson V.

U.S. patent application Ser. No. 11/967,275, entitled "Programmable Power Control System," inventor John L. Melanson, and filed on Dec. 31, 2007 describes exemplary methods and systems and is incorporated by reference in its entirety. Referred to herein as Melanson VI.

U.S. patent application Ser. No. 12/047,262, entitled "Power Control System for Voltage Regulated Light Sources," inventor John L. Melanson, and filed on Mar. 12, 2008 describes exemplary methods and systems and is incorporated by reference in its entirety.

BACKGROUND OF THE INVENTION

1. Field of the Invention

The present invention relates in general to the field of electronics and lighting, and more specifically to a system and method to determine power factor correction control parameters from phase delays in a phase modulated signal.

2. Description of the Related Art

Commercially practical incandescent light bulbs have been available for over 100 years. However, other light sources show promise as commercially viable alternatives to the incandescent light bulb. LEDs are becoming particularly attractive as main stream light sources in part because of energy savings through high efficiency light output and environmental incentives such as the reduction of mercury.

LEDs are semiconductor devices and are driven by direct current. The lumen output intensity (i.e. brightness) of the LED approximately varies in direct proportion to the current flowing through the LED. Thus, increasing current supplied to an LED increases the intensity of the LED and decreasing current supplied to the LED dims the LED. Current can be modified by either directly reducing the direct current level to the white LEDs or by reducing the average current through duty cycle modulation.

Dimming a light source saves energy when operating a light source and also allows a user to adjust the intensity of the light source to a desired level. Many facilities, such as homes and buildings, include light source dimming circuits (referred to herein as "dimmers").

FIG. 1 depicts a lighting system 100 that generates a link voltage $V_{LINK}$ and a drive current $i_{OUT}$ to illuminate the light source 102. An alternating current (AC) voltage source 101 such as a power plant generates a mains voltage $V_{mains}$, which provides power for lighting system 100. The particular frequency and root mean square (RMS) value of mains voltage $V_{mains}$ is generally location specific and is nominally 60 Hz/120 VAC in the United States and 50 Hz/230 VAC in Europe and elsewhere. The lighting system 100 includes a dimmer 104 to generate a raw phase modulated signal $V_{\Phi\_RAW}$. Rectifier 105 rectifies the raw phase modulated signal $V_{\Phi\_RAW}$ to generate a rectified phase modulated signal $V_\Phi$. Rectifier 105 is, for example, a full-bridge diode rectifier. The phase delay of each cycle of the phase modulated signal $V_\Phi$ indicates a particular dimming level. Dimmer 104 can be any conventional dimmer that generates a phase modulated signal, such as a triac based dimmer as described in Melanson I.

The lighting system 100 also includes a light source driver circuit 106 to receive the phase modulated signal $V_\Phi$. In at least one embodiment, light source driver circuit 106 is a switching power converter with an internal PFC switch (not shown) that controls power factor correction and boosting phase modulated signal $V_\Phi$ to the link voltage $V_{LINK}$. The light source driver circuit 106 modulates the light source drive current $i_{OUT}$ in response to the dimming level indicated by phase modulated signal $V_\Phi$. The light source driver circuit 106 modulates the light source drive current $i_{OUT}$ by turning the light source drive current $i_{OUT}$ "on" and "off" to achieve an average value of light source drive current $i_{OUT}$ corresponding to the dimming level indicated bad phase modulated signal $V_\Phi$. The drive current $i_{OUT}$ causes the light source 102 to illuminate, and modulating the drive current $i_{OUT}$ varies the brightness of light source 102. Thus, light source driver circuit 106 attempts to modulate the drive current $i_{OUT}$ so that light source 102 dims to a level indicated by phase modulated signal $V_\Phi$.

For an LED based light source 102, the link voltage $V_{LINK}$ can be 400 V or more. To dim light source 102, light source driver circuit 106 decreases the duty cycle of control signal $C_S$ and, thus, decreases the drive current $i_{OUT}$. When dimmed, the power demand of light source 102 decreases. When the power demand of light source 102 decreases, light source driver circuit 106 decreases the duty cycle of the internal switch (not shown) that controls the voltage boost of phase modulated signal $V_\Phi$ to link voltage $V_{LINK}$. Despite decreasing power demand, light source driver circuit 106 maintains the link voltage $V_{LINK}$ at an approximately constant level. The switching efficiency of light source driver circuit 106 steadily decreases as 106 continues to boost the link voltage $V_{LINK}$ to a voltage used during full power demand by light source 102 despite the lower power demands of a dimmed light source 102. The efficiency loss becomes more prominent, for example, when a duty cycle of the internal PFC switch of light source driver circuit 106 is less than 50%.

Decreasing power demand by light source 102 when dimming light source 102 can actually increase power demand by light source driver circuit 106. Light source driver circuit 106 attempts to provide unity power factor correction so that the light source driver circuit 106 appears resistive to the AC voltage source 101. Thus, looking into terminals A and B, ideally light source driver circuit 106 has an effective resistance $R_{EFF\_0}$ as perceived by the AC voltage source 101. The value of the effective resistance $R_{EFF\_0}$ equals $V_\Phi/i_{IN}$, where $V_\Phi$ is a phase modulated signal and $i_{IN}$ is the input current into light source driver circuit 106. As the power demand by light source 102 decreases when dimmed, the current $i_{IN}$ actually increases, thus, decreasing the effective resistance $R_{EFF\_0}$, thus, drawing more power from AC voltage source 101. Decreasing the effective resistance $R_{EFF\_0}$ of light source driver circuit 106 when dimming light source 102 represents an inefficient use of power.

FIG. 2A depicts a series of voltage waveforms 200 that represent two respective cycles of waveforms present in lighting system 100. Supply voltage $V_{mains}$ is a sine wave depicted with two exemplary cycles 202 and 204. Dimmer 104 generates a raw phase modulated signal $V_\Phi$ by chopping each half cycle of supply voltage $V_{mains}$ to generate identical leading edge phase delay $\alpha 1$ for each respective half cycle of cycle 206. The phase delays of the raw phase modulated signal $V_\Phi$ increase as the dimming level decreases, i.e. the brightness of light source 102 decreases. Half cycle 208 indicates longer phase delays $\alpha 2$ corresponding to a decrease in dimming level. The leading edge phase delays $\alpha X$ represent the elapsed time between a beginning of a half cycle and a leading edge of the phase modulated mains voltage $V_\Phi$, where X is an index value. The rectified cycles 210 and 212 of phase modulated signal $V_\Phi$ have the same respective phase delays $\alpha 1$ and $\alpha 2$ as the raw phase modulated signal $V_{\Phi\_RAW}$.

Conventional dimmers, such as a triac based dimmer, that are designed for use with inactive loads, such as incandescent light bulbs, often do not perform well when supplying a raw phase modulated signal $V_{\Phi\_RAW}$ to an active load such as light source driver circuit 106. For example, when supplying an active load, the dimmer can miss generating phase delays in some cycles of raw phase modulated signal $V_{\Phi\_RAW}$ and can generate ripple during the phase delays. Exemplary problems with at least one conventional dimmer when used with an active load are described in Rand et al., "Issues, Models and Solutions for Triac Modulated Phase Dimming of LED Lamps", June, 2007, pages 1398-1404 of Power Electronics Specialists Conference, 2007. PESC 2007, published by the Institute of Electrical and Electronic Engineers, ISBN 978-1-4244-0655-5.

FIG. 2B depicts an LED driver circuit 250 available from Supertex, Inc. of Sunnyvale, Calif., USA. LED driver circuit 250, represents one embodiment of light source driver circuit 106. The LED driver circuit 250 is described in more detail in Supertex design note DN-H05 available from Supertex, Inc. The LED driver circuit 250 includes two extra circuits, damper circuit 252 and bleeder circuit 254 to provide compatibility with a dimmer, such as dimmer 104. According to DN-H05, the damper circuit 252 provides damped charging of the driver's input filter circuit at P16. The damper circuit 252 provides resistive damping to prevent AC line input current oscillations due to a sudden rise of an AC line voltage, such as the edges of phase modulated signal $V_\Phi$. The bleeder circuit 254 provides a nominal 1 kohm load to a rectified AC line at P21 to suppress a voltage rise at the input capacitors C21-C23 during phase delays of phase modulated signal $V_\Phi$ which could otherwise cause flicker of a lamp driven bid LED driver circuit 250.

FIG. 2C depicts a unity power factor LED lamp driver 280, which represents one embodiment of light source driver circuit 106. The LED lamp driver 280 is described in more detail with reference to FIG. 9 in Supertex application note AN-H52 available from Supertex, Inc. LED lamp driver 280 includes damping circuitry 282 to add a load to dimmer 104 during phase delays of phase modulated signal. The damping circuitry 282 includes a bleeder resistor $R_{BL}$ that is connected by transistor M2 during phase delays of a phase modulated input signal to lamp driver 280. When transistor M2 conducts, the bleeder resistor $R_{BL}$ provides an added load to the AC line at $V_{IN}$ to dampen the phase modulated signal during phase delays. Adding an extra transistor M2 and resistor $R_{BL}$ increases the system cost of lamp driver 280.

The light source driver circuit 106 exhibits one or more inefficiencies when dimming light source 102. For example, when the power demand by light source 102 decreases, the link voltage remains approximately constant. Additionally, when power demand by light source 102 decreases, the effective resistance $R_{EFF\_0}$ of light source driver circuit 106 increases, thus drawing more power from AC voltage source 101 despite the lower power demands by light source 102. Additionally, added circuitry to conventional LED driver circuits adds cost to the LED driver circuits.

SUMMARY OF THE INVENTION

In one embodiment of the present invention, a light emitting diode (LED) lighting system includes a power factor correction (PFC) controller. The controller includes an input to receive a phase delay signal indicating a phase delay of a phase modulated dimmer signal. The controller also includes a digital signal processor, coupled to the input, to receive the phase delay signal and determine a PFC control operating parameter from the phase delay signal and to generate a PFC switch control signal using the determined operating parameter.

In another embodiment of the present invention, a method of controlling a light emitting diode (LED) lighting system includes receiving a phase delay signal indicating a phase delay of a phase modulated dimmer signal, determining a PFC control operating parameter from the phase delay signal using a digital signal processor, and generating a PFC switch control signal using the determined operating parameter.

In a further embodiment of the present invention, a light emitting diode (LED) lighting system includes a power factor correction (PFC) controller to receive a signal indicating a dimming level and to generate a PFC switch control signal to cause a PFC LED driver circuit to respond to the dimming level indicated by the signal without decreasing an effective resistance of the PFC load driver circuit, as perceived by a voltage source of the PFC load driver circuit, as the dimming level indicated by the signal increases.

In a further embodiment of the present invention, a method of controlling a light emitting diode (LED) lighting system includes receiving a signal indicating a dimming level and generating a power factor correction control signal to cause a PFC LED driver circuit to respond to the dimming level indicated by the signal without decreasing an effective resistance of the PFC load driver circuit, as perceived by a voltage source of the PFC load driver circuit, as the dimming level indicated by the signal increases.

In a further embodiment of the present invention, a light emitting diode (LED) lighting system includes a power factor correction (PFC) controller to generate a duty cycle modulated control signal to control a regulated link voltage of a PFC LED driver circuit and to decrease the link voltage when a duty cycle of the control signal decreases to a value between zero and a duty cycle threshold value.

In a further embodiment of the present invention, a method of controlling a light emitting diode (LED) lighting system includes generating a duty cycle modulated control signal to control a regulated link voltage of a PFC LED driver circuit; and decreasing the link voltage when a duty cycle of the control signal decreases to a value between zero and a duty cycle threshold value.

In a further embodiment of the present invention, a light emitting diode (LED) lighting system includes a power factor correction (PFC) controller includes: an input to receive a phase delay signal indicating a phase delay of a phase modulated dimmer signal. The PFC controller is configured to receive the phase delay signal and to generate pulses for the PFC switch control signal during the phase delays of the phase modulated signal. The pulse widths and duty cycles of the pulses of the PFC switch control signal generated during the phase delays are sufficient to attenuate ripple of the phase modulated signal during the phase delays of phase modulated signal.

In a further embodiment of the present invention, a method of controlling a light emitting diode (LED) lighting system includes receiving a phase delay signal indicating a phase delays of a phase modulated dimmer signal and generating pulses for a PFC switch control signal during the phase delays of the phase modulated signal. The pulse widths and duty cycles of the pulses of the PFC switch control signal generated during the phase delays are sufficient to attenuate ripple of the phase modulated signal during the phase delays of phase modulated signal.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A light emitting diode (LED) lighting system includes a power factor correction (PFC) controller that determines at least one power factor correction control parameter from phase delays of a phase modulated signal. In at least one embodiment, a peak voltage of the phase modulated signal is a PFC control parameter used by the PFC controller to control power factor correction and generation of a link voltage by a PFC LED driver circuit. The phase delays are related to a peak voltage of the phase modulated signal. Thus, in at least one embodiment, detecting the phase delay in one or more cycles of the phase modulated signal allows the PFC controller to determine the peak voltage of the phase modulated signal.

The PFC LED driver circuit supplies an output current to drive LED(s) of an LED apparatus. As the dimming level decreases, the PFC controller decreases a duty cycle of a PFC switch in the PFC LED driver circuit to cause the PFC LED driver circuit to decrease the output current supplied to the LEDs. When the phase modulated signal indicates a dimming level below a threshold value, the PFC controller maintains an approximately constant duty cycle of the PFC switch to, for example, maintain switching efficiency without significantly sacrificing power factor correction.

In at least one embodiment, PFC controller generates a PFC switch control signal to cause the PFC LED driver circuit to respond to decreasing dimming levels as indicated by a dimming signal, such as the phase modulated signal, without decreasing an effective resistance of the PFC LED driver circuit, as perceived by a voltage source of the PFC LED driver circuit, as the dimming level indicated by the dimming signal increases. The phase modulated signal represents one embodiment of the dimming signal.

In at least one embodiment, the PFC controller generates a duly cycle modulated control signal to control a regulated link voltage of the PFC LED driver circuit and decreases the link voltage when a duty cycle of the control signal decreases to a value between zero and a duty cycle threshold value.

In at least one embodiment, the PFC controller generates approximately constant pulse widths for the PFC switch control signal during each cycle of phase modulated signal when a duty cycle of PFC switch control signal is below a predetermined threshold.

In at least one embodiment, the PFC controller generates pulses for the PFC switch control signal during the phase delays of phase modulated signal, wherein the pulses of PFC switch control signal generated during the phase delays have a period significantly greater than a period of the pulses of PFC switch control signal during an active period of phase modulated signal.

Figure 3:
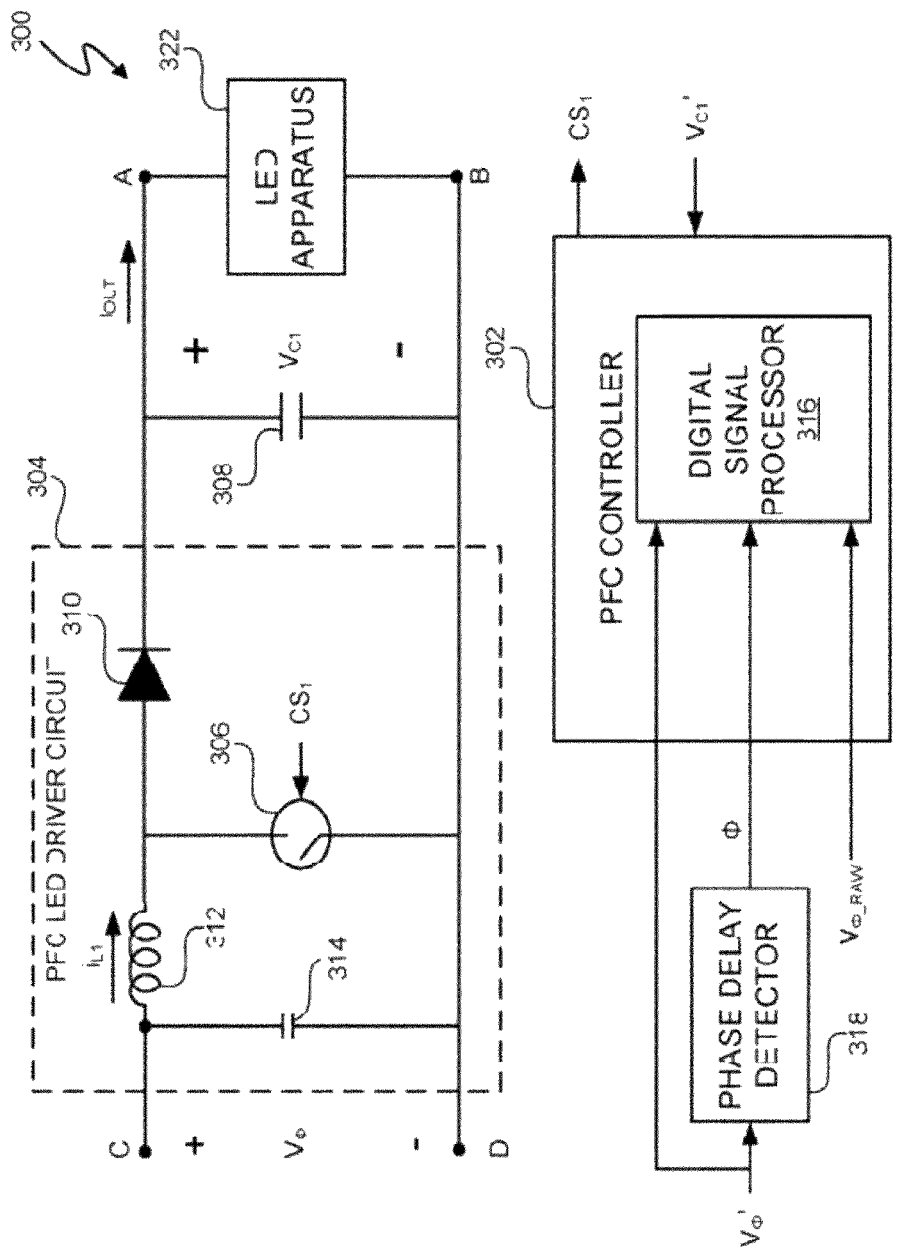
FIG. 3 depicts a light emitting diode lighting system with a power factor correction controller that derives one or more power factor correction control parameters from a phase modulated signal.

FIG. 3 depicts a lighting system 300 having a PFC controller 302 and a PFC LED driver circuit 304. The PFC controller 302 generates a duly cycle modulated PFC switch control signal $CS_1$ to control the conductivity of switch 306. Switch 306 can be any switch, and, in at least one embodiment, switch 306 is an n-channel field effect transistor (FET). The PFC LED driver circuit 304 is a switching power converter that boosts the phase modulated signal $V_\Phi$ to a link voltage $V_{C1}$ across hold-up capacitor 308. In at least one embodiment, the link voltage $V_{C1}$ has a peak voltage in the range of 200V-400 V. When switch 306 is "OFF" (i.e. non-conductive), diode 310 is forward biased, and inductor 312 drives inductor current $i_{L1}$ through diode 310. The inductor current $i_{L1}$ through diode 310 charges capacitor 308 to maintain an approximately constant link voltage $V_{C1}$. When switch 306 is "ON" (i.e. conductive), the voltage across inductor 312 reverses, diode 310 is reverse biased, and the inductor 312 energizes with the current $i_{L1}$. PFC controller 302 controls the duty cycles of PFC switch control signal $CS_1$ and switch 306 so that current $i_{L1}$ is proportional to phase modulated signal $V_\Phi$. Capacitor 314 provides filtering to smooth drive current $i_{L1}$ so that the average drive current $i_{L1}$ is sinusoidal and in phase with phase modulated signal $V_\Phi$.

The PFC controller 302 includes a digital signal processor 316 to perform various operations including determining the pulse width and dub cycle of PFC switch control signal $CS_1$. Digital signal processor 316 is, for example, a digital signal processor. In at least one embodiment, the PFC controller 302 determines the pulse width and duty cycle of PFC switch control signal $CS_1$ utilizing the algorithms disclosed in Melanson V and Melanson VI.

In at least one embodiment, the pulse width T1 of PFC switch control signal $CS_1$ is determined by digital signal processor 316 by executing a control signal state algorithm represented by Equation [1]:

$$T1^2 = \frac{2 \cdot L}{V_{\Phi\_pk}^2} \cdot P \cdot TT \cdot \left(1 - \frac{V_\Phi}{V_{C1}}\right). \quad [1]$$

"T1" is the pulse width of the PFC switch control signal $CS_1$. "L" represents an inductance value of inductor 312. "$V_{\Phi\_pk}$" is a peak voltage of phase modulated signal $V_\Phi$ without phase delays. "P" represents a power demand variable related to the power demand of LED apparatus 322. In at least one embodiment, P is a proportional integrator output value as described in Melanson V and Melanson VI. "TT" is the period of PFC switch control signal $CS_1$ and, in at least one embodiment, is also determined as described in Melanson V and Melanson VI. "$V_\Phi$" is a sampled value of phase modulated signal $V_\Phi$. "$V_{C1}$" is a sampled value of the link voltage $V_{C1}$.

In at least one embodiment, all of the PFC control parameters of Equation [1] are known, can be reliably determined directly, or can be reliably determined from the feedback signals $V_\Phi'$ and $V_{C1}'$ except $V_{\Phi\_pk}$. Because phase modulated signal $V_\Phi$ includes phase delays when dimming the LEDs of LED apparatus 322, the peak voltage $V_{\Phi\_pk}$ of phase modulated signal $V_\Phi$ cannot always be directly measured. However, as described in conjunction with FIGS. 4 and 5, the phase delays of phase modulated signal $V_\Phi$ can be used by digital signal processor 316 to estimate $V_{\Phi\_pk}$.

In at least one embodiment, PFC controller 302 also controls the output current $i_{OUT}$ in accordance with the exemplary systems and methods described in Melanson IV.

Figure 4:
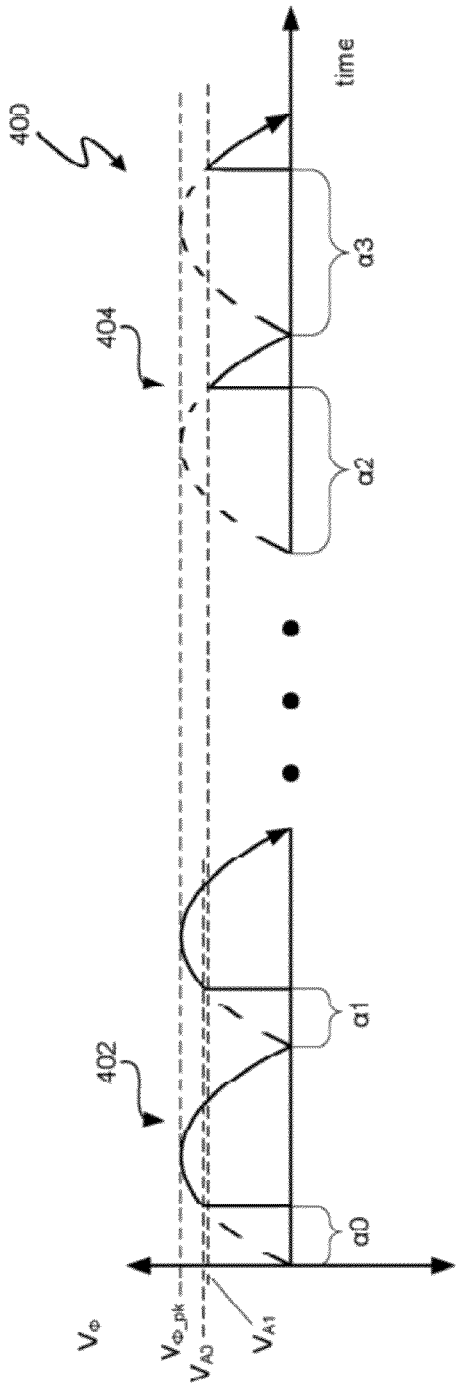
FIGS. 4 and 5 depict phase modulated signals having various leading and trailing edge phase delays.
Figure 5:
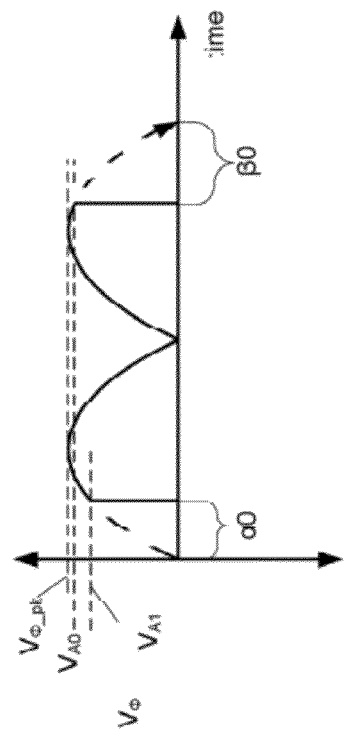

FIGS. 4 and 5 depict cycles of phase modulated signal $V_\Phi$ having various leading and trailing edge phase delays. Waveforms 400 represent two cycles 402 and 404 having a peak voltage of $V_{\Phi\_pk}$. Cycle 402 includes two phase delays $\alpha 0$ and $\alpha 1$, and cycle 404 includes two phase delays $\alpha 2$ and $\alpha 3$. The peak voltage $V_{\Phi\_pk}$ can be measured directly from cycle 402 because the phase delays $\alpha 0$ and $\alpha 1$ are less than T/4, where T is the period of phase modulated signal $V_\Phi$. However, the peak voltage $V_{\Phi\_pk}$ cannot be measured directly from cycle 404 because the phase delays $\alpha 2$ and $\alpha 3$ are greater than T/4. Although the peak voltage $V_{\Phi\_pk}$ can be measured directly from cycle 402, in at least one embodiment, the digital signal processor 316 determines the peak voltage $V_{\Phi\_pk}$ for all cycles of phase modulated signal $V_\Phi$. In at least one embodiment, the digital signal processor 316 periodically or intermittently determines the peaks voltage $V_{\Phi\_pk}$. In at least one embodiment, the digital signal processor 316 measures each peak voltage $V_{\Phi\_pk}$ from each cycle that can be measured.

Referring to FIGS. 3, 4, and 5, phase delay detector 318 receives phase modulated signal $V_\Phi$ and, in at least one embodiment, determines a digital value of each phase delay $\alpha X$ and $\beta X$ in each cycle of phase modulated signal $V_\Phi$, where X is an index value. To determine the peak voltage $V_{\Phi\_pk}$ from the phase delays of phase modulated signal $V_\Phi$, phase delay detector 318 detects the phase delays of each cycle of phase modulated signal $V_\Phi$. In at least one embodiment, phase delay detector 318 generates a digital value of phase delay signal $\Phi$ for each phase delay detected in phase modulated signal $V_\Phi$. Each digital value of phase delay signal $\Phi$ represents a phase delay, and each phase delay indicates a dimming level. For example, a 50 Hz phase modulated signal $V_\Phi$ has a period of 1/50 or 0.02 seconds. A dimming level of 25% is represented by a phase delay of (0.5·0.02)·0.25 seconds. Where (0.5·0.02) represents the duration of each half cycle of phase modulated signal $V_\Phi$ and 0.25 represents the dimming level. Thus, each phase delay signal $\Phi$ can also be referred to as a dimmer signal.

Digital signal processor 316 determines the peak voltage $V_{\Phi\_pk}$ from the phase delay signal $\Phi$. Each half cycle of phase modulated signal $V_\Phi$ represents 180 degrees. Each phase delay can be converted into an equivalent phase angle in accordance with Equation [2]:

$$\text{phase angle} = (2 \cdot \text{phase delay})/(T) \times 180° \quad [2]$$

where T is the period of phase modulated signal $V_\Phi$.

In at least one embodiment, digital signal processor 316 determines the peak voltage $V_{\Phi\_pk}$ in accordance with Equation [3]:

$$V_{\Phi\_pk} = \text{abs}\{V_{Ax}/[\sin(\text{phase angle})]\}, \quad [3]$$

where "abs" represents the absolute value function of the quantity enclosed by the brackets and $V_{Ax}$ represents a peak voltage of the leading or trailing edge associated with the phase delay, and "x" is an index.

For example, if phase modulated signal $V_\Phi$ is a 50 Hz signal and $\alpha 0 = \alpha 1$, from Equations [2] and [3] the peak voltage $V_{\Phi\_pk}$ for the first half of cycle 402 equals $\text{abs}\{V_{A0}/[\sin((2 \cdot \alpha 0)/0.02) \cdot 180]\}$. If $\alpha 2 = \alpha 3$, from Equations [2] and [3], the peak voltage $V_{\Phi\_pk}$ for the second half of cycle 402 equals $\text{abs}\{V_{A1}/[\sin((2 \cdot \alpha 2)/0.02) \cdot 180]\}$.

In at least one embodiment, phase delays $\alpha 0$ and $\alpha 1$ are independently generated as, for example, described in Melanson II and Melanson III. When phase delays in a cycle are independently generated, the peak voltage $V_{\Phi\_pk}$ can be updated for each independently generated phase delay.

FIG. 5 depicts a leading edge phase delay $\alpha$ and a trailing edge phase delay $\beta 0$. In at least one embodiment, digital signal processor 316 determines the peak-voltage $V_{\Phi\_pk}$ in accordance with Equations [2] and [3] for independently generated leading and trailing edge phase delays. When detecting independently generated leading and trailing edge phase delays, in at least one embodiment, digital signal processor 316 receives the raw phase modulated signal $V_{\Phi\_RAW}$ to determine start and stop times of each half cycle of a cycle by, for example, sensing the polarity of each half cycle.

Figure 6:
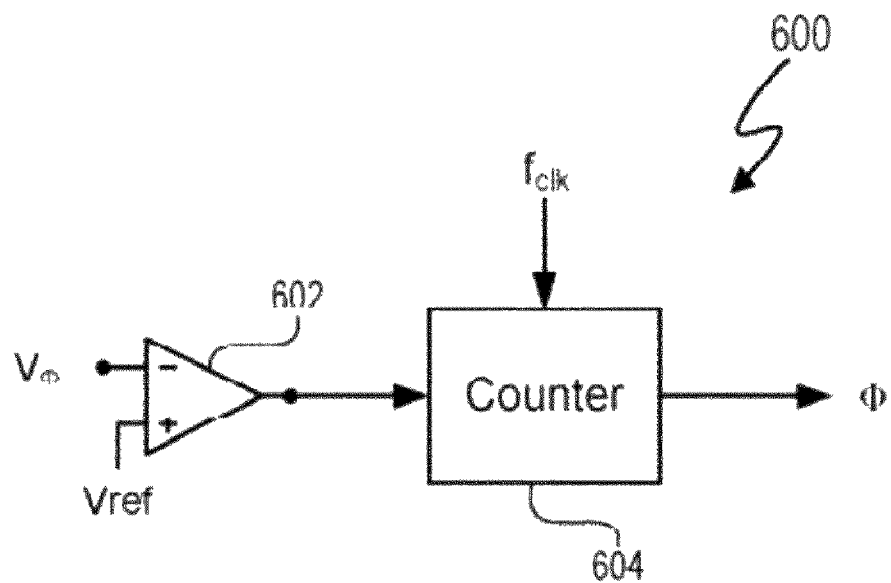
FIG. 6 depicts a phase delay detector.

FIG. 6 depicts a time-based phase delays detector 600 that represents one embodiment of phase delays detector 318. Comparator 602 compares phase modulated signal $V_\Phi$ to a known reference Vref. The reference $V_{ref}$ is generally the cycle cross-over point voltage of phase modulated signal $V_\Phi$, such as a neutral potential of a building AC voltage. In at least one embodiment, the reference $V_{ref}$ is a voltage value just greater than any expected voltage ripples of the neutral potential. The counter 604 counts the number of cycles of clock signal $f_{clk}$ that occur until the comparator 602 indicates that an edge of phase modulated signal $V_\Phi$ has been reached. Since the frequency of phase modulated signal $V_\Phi$ and the frequency of clock signal $f_{clk}$ is known, the phase delay indicated by phase delay signal $\Phi$ can be determined from the count of cycles of clock signal $f_{clk}$ that occur until the comparator 602 indicates that the edge of phase modulated signal $V_\Phi$ has been reached. Thus, phase delay detector 600 is a time-based phase delay detector that detects the phase delays phase delay indicated by phase delay signal $\Phi$ using a time-based process.

Figure 7:
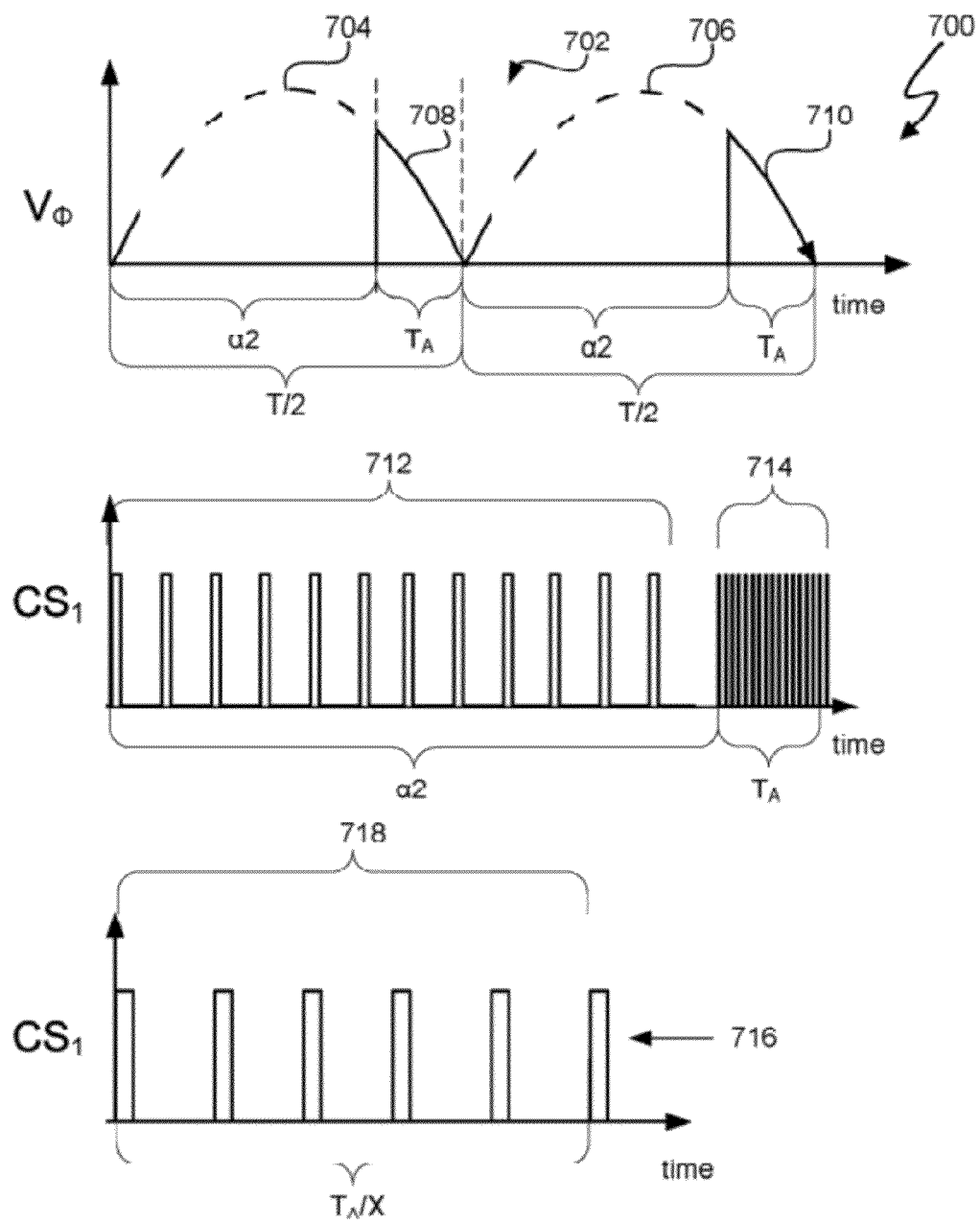
FIG. 7 depicts exemplar, phase modulated signal and associated PFC switch control signal waveforms.

FIG. 7 depicts exemplary waveforms 700 representing one cycle 702 of phase modulated signal $V_\Phi$ and pulse waveforms of PFC switch control signal $CS_1$. In at least one embodiment, the PFC controller 302 continues to pulse the PFC switch 306. i.e. turn the PFC switch 306 ON and OFF, during phase delays of phase modulated signal $V_\Phi$ to increase the effective resistance $R_{EFF\_1}$ of PFC LED driver circuit 304 without additional external components and without additional loss of efficiency.

Figure 1:
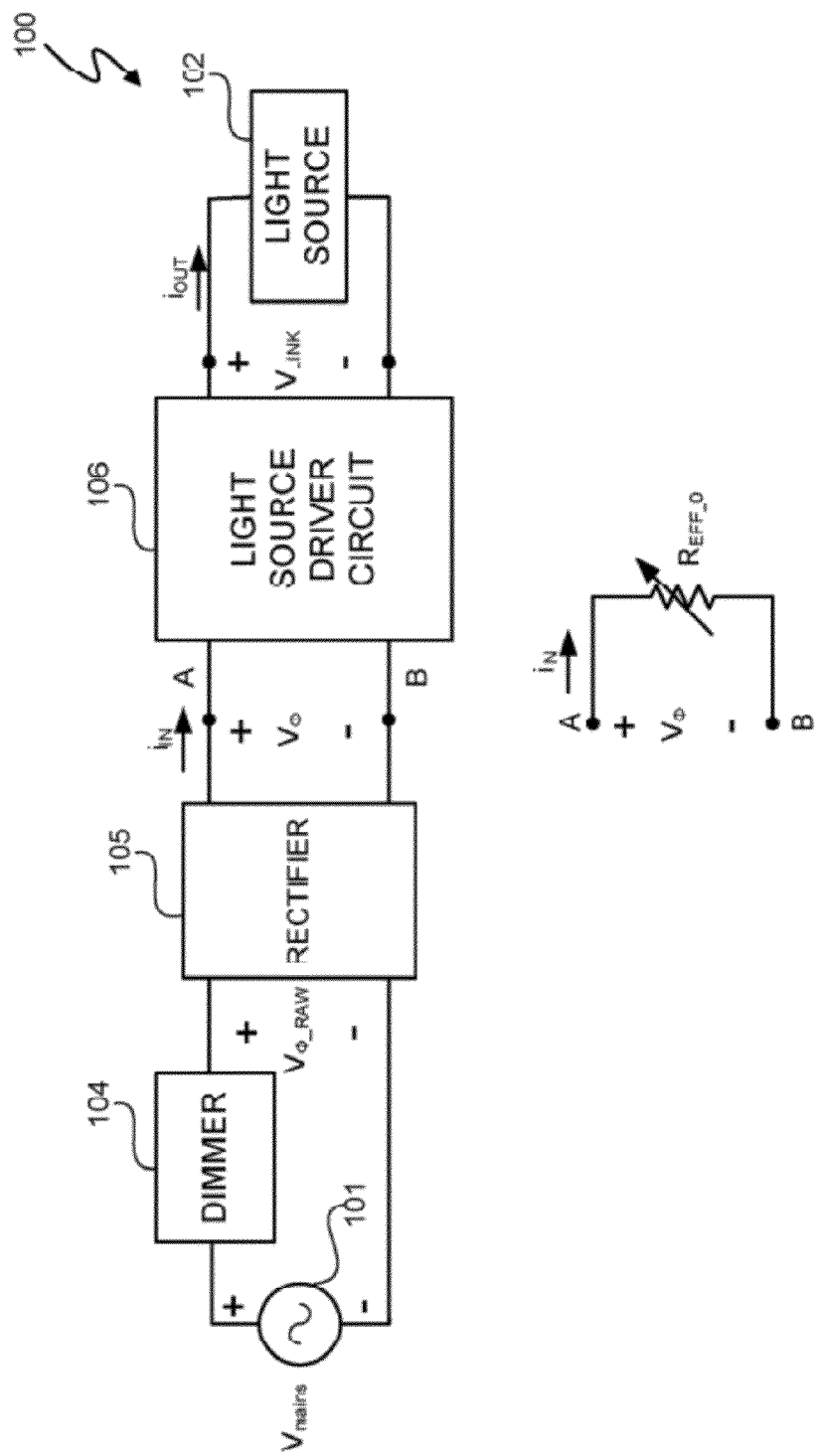
FIG. 1 (labeled prior art) depicts a lighting system with a power factor correction driver circuit and controller.

The phase delays $\alpha 2$ of cycle 702 of phase modulated signal $V_\Phi$ indicate dimming levels for the LEDs. Increasing phase delays indicate increasing dimming levels and decreasing power demand from PFC LED driver circuit. Referring to FIGS. 3 and 7, half cycles 704 and 706 of phase modulated signal $V_\Phi$ each include respective active (uncut) regions 708 and 710 having an active time period $T_A$ (referred to as "active period $T_A$"). The active period $T_A$ plus the phase delay $\alpha 2$ equals the half cycle period T/2 of cycle 702. Referring to FIG. 1, conventional PFC driver circuit and controllers, such as light source driver circuit 106, cut off the output current $i_{OUT}$ during the phase delay $\alpha 2$. The phase modulated signal $V_\Phi$ of FIG. 1 often has ripples during the phase delay $\alpha 2$ that can cause problems, such as making the edges of phase modulated signal $V_\Phi$ difficult to detect.

Figure 2A:
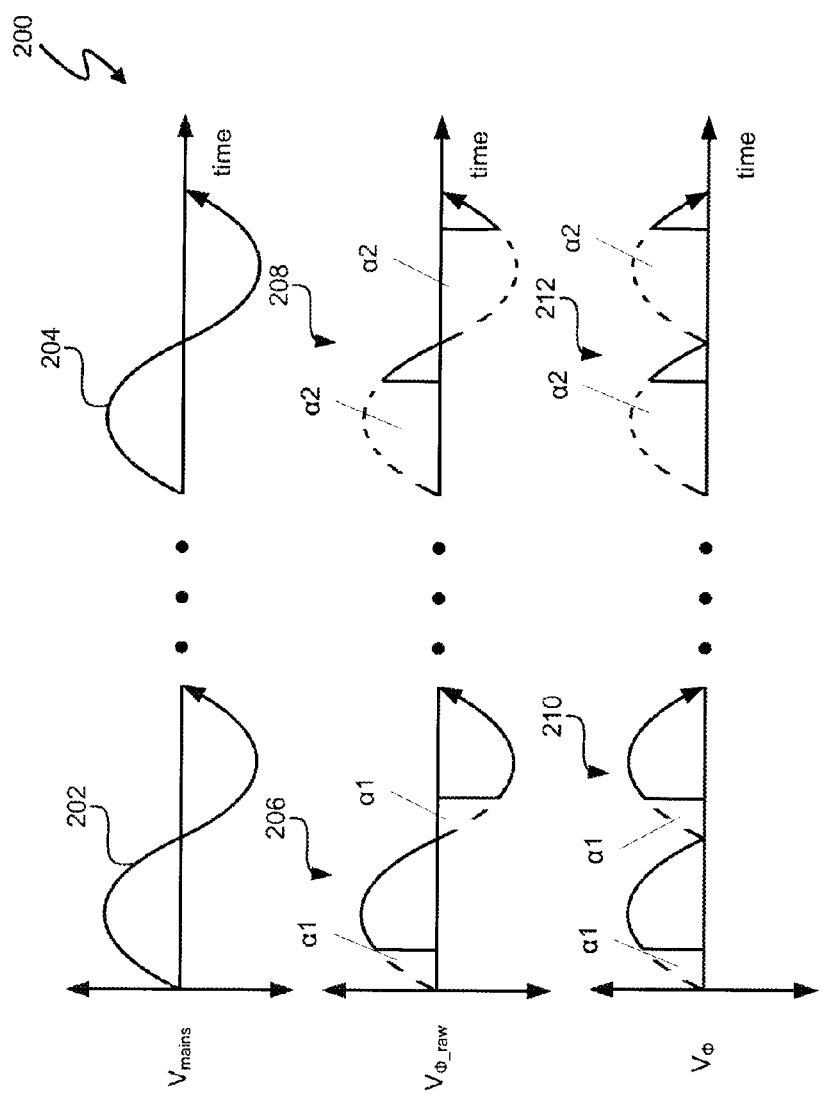
FIG. 2A (labeled prior art) depicts various waveforms present in the lighting system of FIG. 1.
Figure 2B:
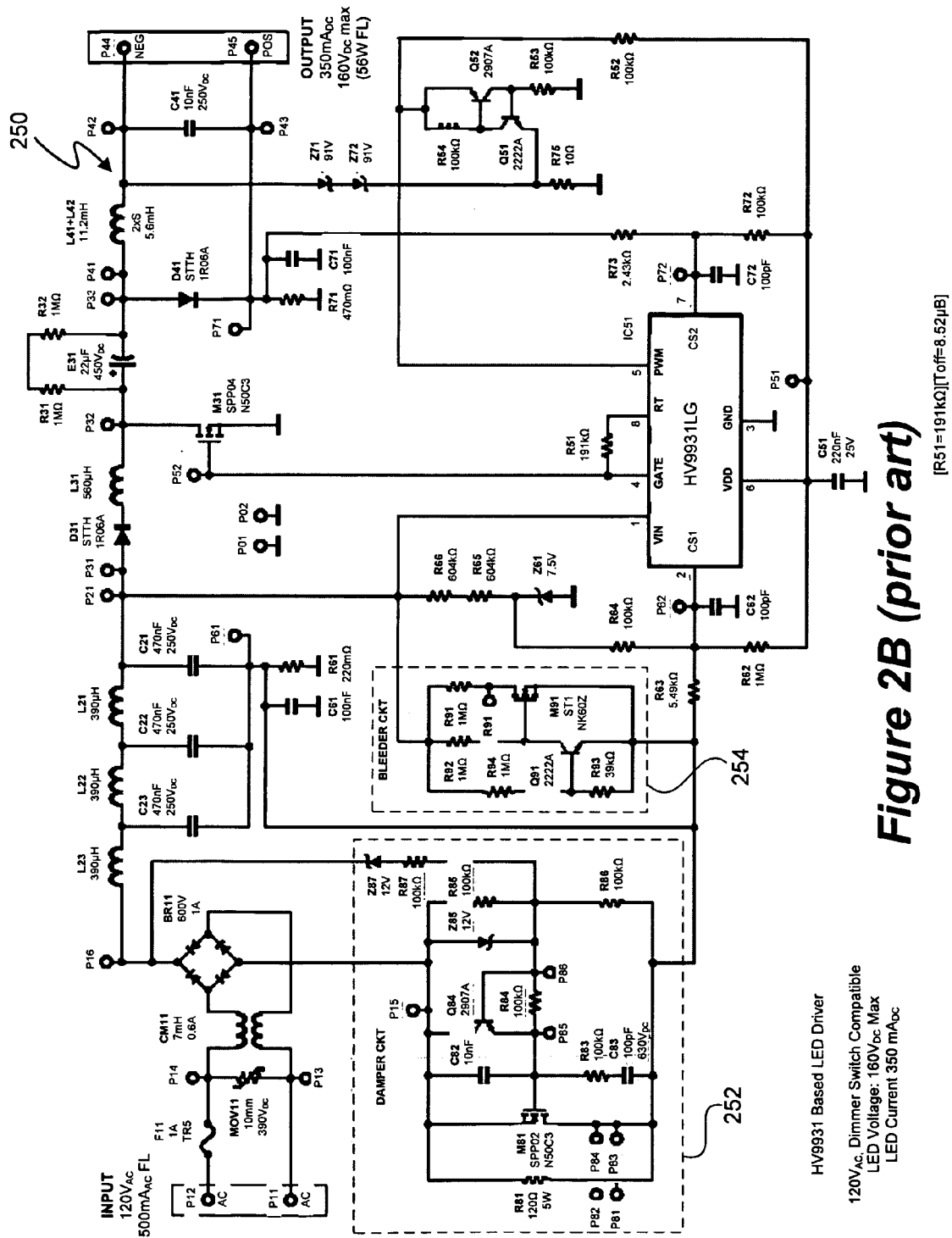
FIG. 2B (labeled prior art) depicts an LED driver circuit with dimmer switch compatibility circuits.
Figure 2C:
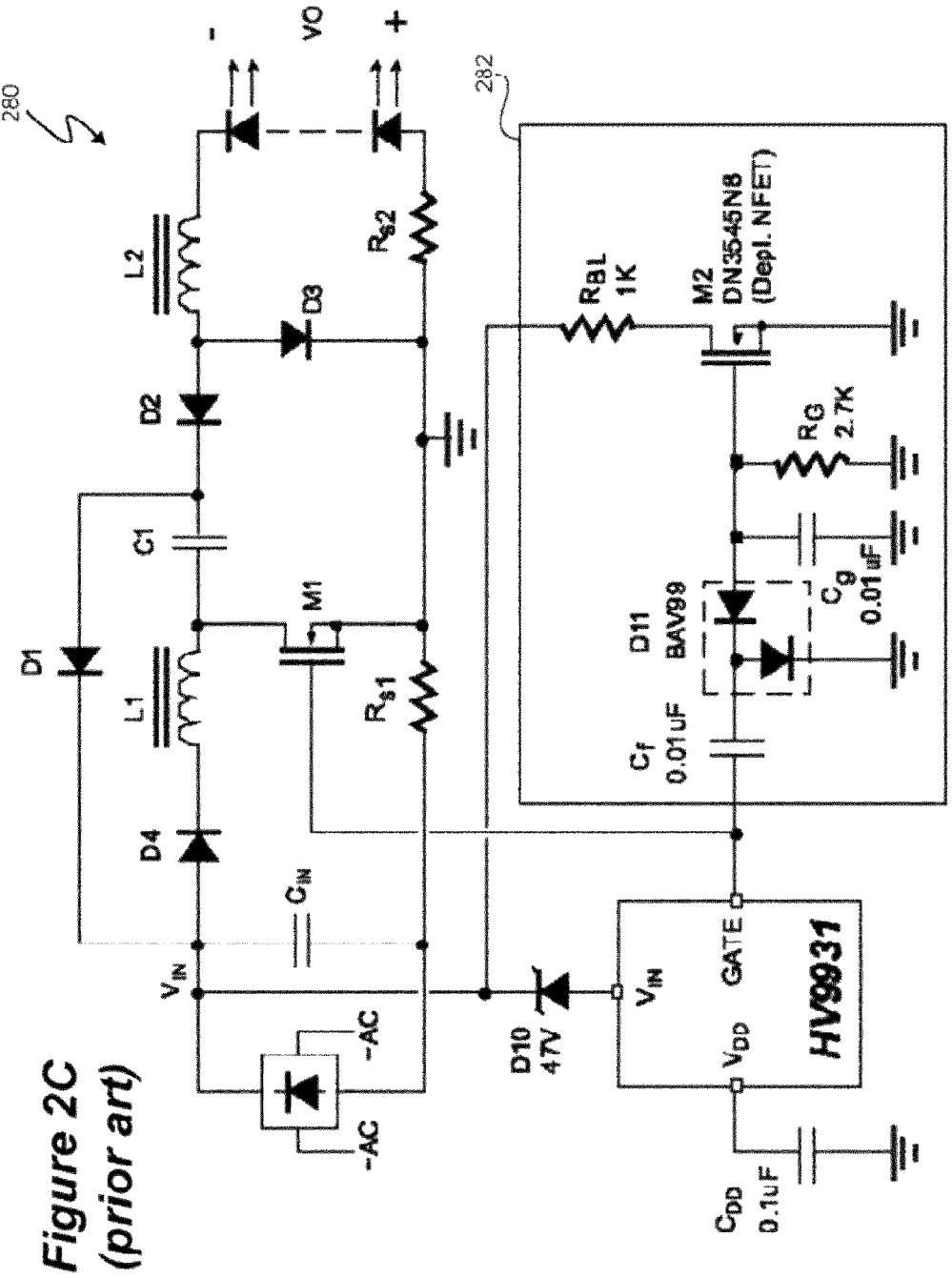
FIG. 2C (labeled prior art) depicts another LED driver circuit with dimmer switch compatibility circuitry.

Referring to FIGS. 3 and 7, in at least one embodiment, during the phase delay $\alpha 2$, PFC controller 302 generates pulses 712 that decrease the effective resistance $R_{EFF\_1}$ of PFC switch control signal $CS_1$ and attenuates ripples of phase modulated signal $V_\Phi$ during phase delay $\alpha 2$. By attenuating the ripples of phase modulated signal $V_\Phi$ during $\alpha 2$, phase modulated signal $V_\Phi$ is approximately 0 V during phase delay $\alpha 2$ as shown in cycle 702. Attenuating the ripples facilitates more accurate edge detection by phase delay detector 318. A more accurate edge detection facilitates a more accurate determination of the dimming level indicated by phase modulated signal $V_\Phi$ and a more accurate determination of peak voltage $V_{\Phi\_pk}$. The periods and duty cycles of PFC switch control signal $CS_1$ during phase delay $\alpha 2$ are not drawn to scale. In at least one embodiment, the periods and duty cycles of PFC switch control signal $CS_1$ are sufficient enough to attenuate the ripples of phase modulated signal $V_\Phi$. In at least one embodiment, the period of PFC switch control signal $CS_1$ during phase delay $\alpha 2$ is 0.0001 seconds to 0.0002 seconds, which equates to a switching frequency ranging from 10 kHz to 20 kHz. Keeping a dimmer, such as dimmer 104 (FIG. 1) loaded during phase delays improves dimmer performance, thus, removing the need for the additional damping circuitry 282 of LED lamp driver 280 (FIG. 2).

Generally, during the active period $T_A$ of phase modulated signal $V_\Phi$, PFC controller 302 determines the pulse widths of PFC switch control signal $CS_1$ in accordance with Equation [1]. However, as the phase delay $\beta 2$ increases, the duty cycle of PFC switch control signal $CS_1$ also decreases. In at least one embodiment, once the duty cycle of PFC switch control signal $CS_1$ is below a duty cycle threshold, the $[1-(V_\Phi/V_{C1})]$ term of Equation [1] becomes approximately 1. Accordingly, in at least one embodiment, once the duty cycle of PFC controller 302 is below the duty cycle threshold, PFC controller 302 generates pulses 714 of PFC switch control signal $CS_1$ with a constant pulse width and constant duty cycle. In at least one embodiment, the PFC controller 302 generates pulses 714 within a frequency range of 25 kHz to 150 kHz to avoid audio frequencies at the low frequency end and avoid switching inefficiencies on the high frequency end. Additionally, in lighting applications, frequencies associated with commercial electronic devices, such as infrared remote controls, are avoided. In at least one embodiment, the particular duty cycle threshold is a matter of design choice and is, for example, chosen to be a duty cycle when $[1-(V_\Phi/V_{C1})]$ term of Equation [1] becomes approximately 1 so that the decreasing duty cycle does not have an unacceptable effect on the performance of lighting system 300. In at least one embodiment the duty cycle threshold is 0.4.

Pulses 716 of control signal $CS_1$ represent a time expanded window 718 of pulses 714 to illustrate the constant pulse widths of pulses 714. The pulses 716 are exemplary and not necessarily to scale. The duration of window 718 is $T_A/X$, and X is a factor equal to 5/(frequency of PFC switch control signal $CS_1$).

Figure 8:
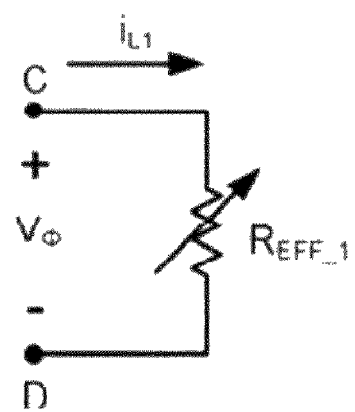
FIG. 8 depicts an effective resistance model of a PFC LED driver circuit.

FIG. 8 depicts an effective resistance model of PFC LED driver circuit 304. PFC LED driver circuit 304 has an effective resistance $R_{EFF\_1}$ from the perspective of a mains voltage source such as the AC voltage source 101 (FIG. 1). In at least one embodiment. PFC controller 302 generates a PFC switch control signal $CS_1$ to cause PFC LED driver circuit 304 to respond to the dimming level indicated by the phase delay signal $\Phi$ without decreasing an effective resistance $R_{EFF\_1}$ of the PFC LED driver circuit 304, as perceived by a voltage source of the PFC LED driver circuit 304, as the dimming level indicated by the signal increases. Keeping the effective resistance $R_{EFF\_1}$ of the PFC LED driver circuit 304 from decreasing as dimming levels increase conserves power.

In at least one embodiment, digital signal processor 316 monitors power demand of the LED apparatus 322 by monitoring the value of power demand variable P in Equation [1]. As power demand of the LED apparatus 322 decreases due to, for example, increased dimming, the value of power demand variable P decreases. By determining the pulse width of PFC switch control signal $CS_1$ in accordance with Equation [1], digital signal processor 316 decreases the pulse width and, thus, the duty cycle of PFC switch control signal $CS_1$.

Decreasing the duty cycle of PFC switch control signal $CS_1$ keeps the effective resistance $R_{EFF\_1}$ from increasing with increasing dimming levels.

Figure 9:
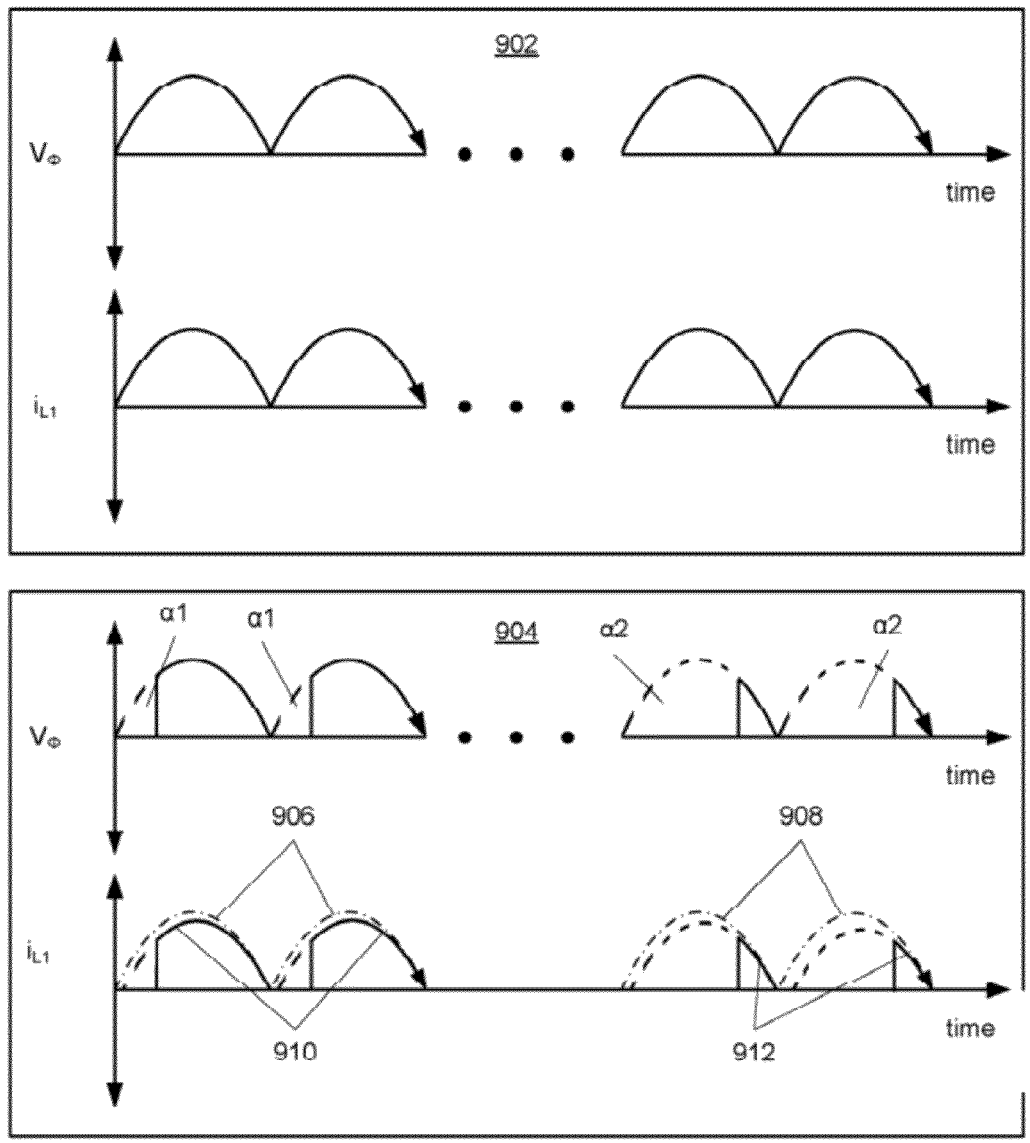
FIG. 9 depicts relationships between a phase modulated signal and an inductor current with and without dimming.

FIG. 9 depicts exemplary relationships between phase modulated signal $V_\Phi$ and the inductor current $i_{L1}$ without dimming in view 902 and with dimming in view 904. Referring to FIGS. 3 and 9, the effective resistance $R_{EFF\_1}$ of PFC load driver circuit 304 equals $V_\Phi/i_{L1}$. In view 902, phase modulated signal $V_\Phi$ has no phase delays, which indicates no dimming. Because PFC load driver circuit 304 is power factor corrected, the inductor current $i_{L1}$ tracks and is in phase with the phase modulated signal $V_\Phi$. In view 904, phase modulated signal $V_\Phi$ includes phase delays $\alpha 1$ and $\alpha 2$, which indicates dimming. The dashed lined waveforms 906 and 908 represent the values of the inductor current $i_{L1}$ if the inductor current $i_{L1}$ had not decreased with dimming. The solid lined waveforms 910 and 912 indicate the actual value of inductor current $i_{L1}$ as controlled by PFC controller 302. Thus, the effective resistance $R_{EFF\_1}$ of PFC load driver circuit 304 does not decrease as dimming levels increase and, in at least one embodiment, actually increases as dimming levels increase.

Figure 10:
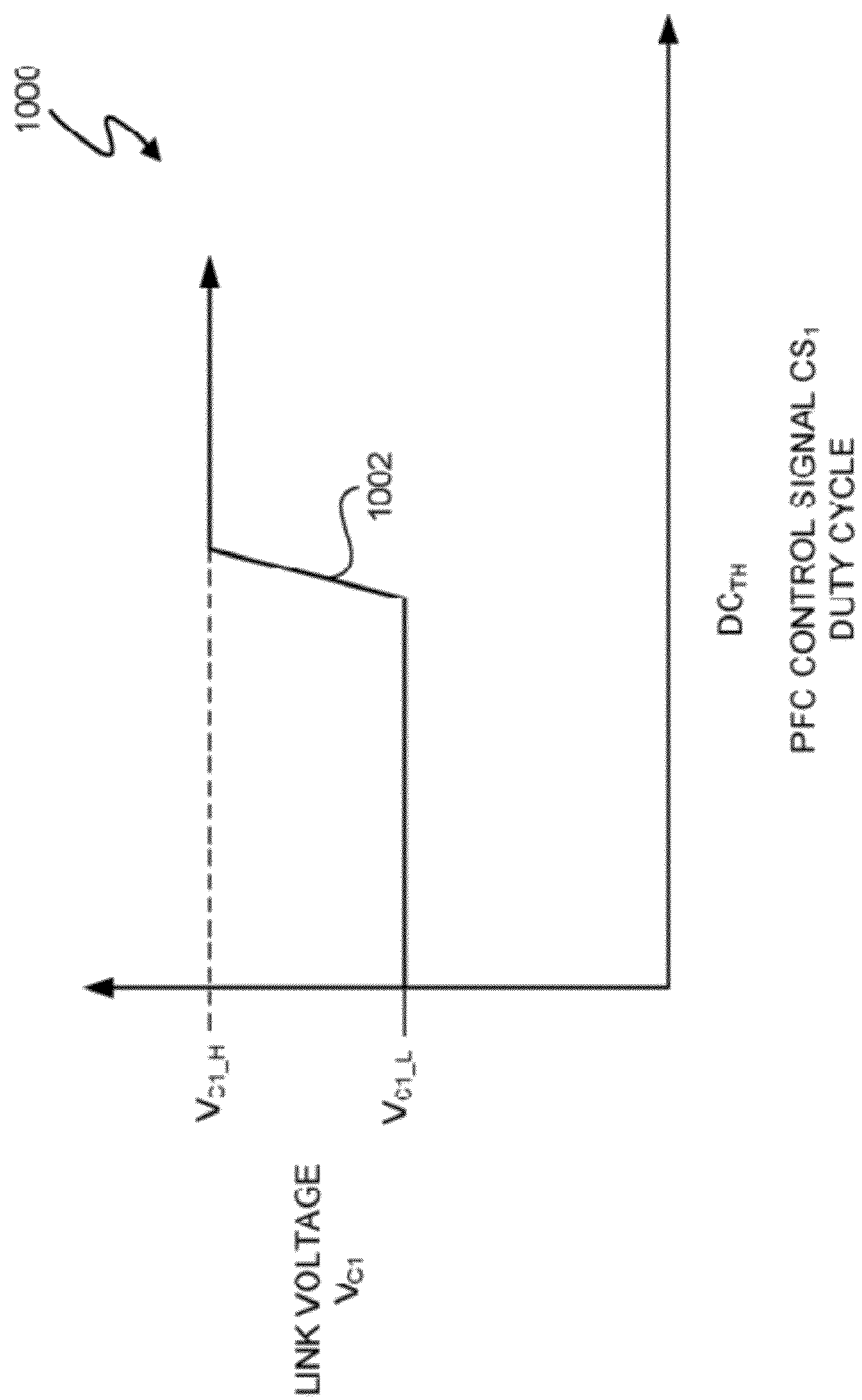
FIG. 10 depicts a relationship between duty cycles of a PFC switch control signal and a link voltage.

FIG. 10 depicts an exemplary, graphical relationship 1000 between duty cycles of PFC switch control signal $CS_1$ and the link voltage $V_{C1}$. Referring to FIGS. 3 and 10, PFC load driver circuit 304 boosts the phase modulated signal $V_\Phi$ to different link voltages $V_{C1}$ depending upon the duty cycle of PFC switch control signal $CS_1$. Decreasing the power demand of LED apparatus 322 results in a decreasing value of the power demand variable P in Equation [1]. In accordance with Equation [1], PFC controller 302 responds to decreasing power demand by LED apparatus 322 by decreasing the duty cycle of PFC switch control signal $CS_1$. The decreasing power demand by LED apparatus 322 is, for example, caused by dimming the LEDs of LED apparatus 322. In at least one embodiment, boosting the phase modulated signal $V_\Phi$ to the high link voltage $V_{C1\_H}$ results in a boost of 120 VAC to an approximately 400 V direct current voltage. As the duty cycle of PFC switch control signal $CS_1$ decreases with decreased power demand by LED apparatus 322, PFC load driver circuit 304 loses efficiency via, for example, switching losses associated with switch 306.

Accordingly, in at least one embodiment, PFC controller 302 generates the duty cycle modulated PFC switch control signal $CS_1$ to control the regulated link voltage Vc1 of the PFC LED driver circuit 304. PFC controller 302 decreases the link voltage $V_{C1}$ from a high link voltage value $V_{C1\_H}$ to a low link voltage value $V_{C1\_L}$ when the duty cycle of the PFC switch control signal $CS_1$ decreases to a value between zero and a duty cycle threshold $DC_{TH}$. The particular value of the duty cycle threshold $DC_{TH}$ is a matter of design choice and is, for example, chosen to increase the efficiency of PFC load driver circuit 304 while providing an adequate link voltage $V_{C1}$ to provide the power demand needs of LED apparatus 322. In at least one embodiment, the duty cycle threshold $DC_{TH}$ is set at 0.5. In at least one embodiment, for phase modulated signal $V_\Phi$ having a voltage peak $V_{\Phi\_pk}$ of 120V, the high link voltage $V_{C1\_H}$ is any value within a range of approximately 200V to 400V for a low link voltage $V_{C1\_L}$ having a respective value within a range of approximately 120V to 175V.

The slope and shape of the transition 1002 from the high link voltage $V_{C1\_H}$ to the low link voltage $V_{C1\_L}$ are matters of design choice and depend upon, for example, a desired transition between high link voltage $V_{C1\_H}$ and the low link voltage $V_{C1\_L}$. In at least one embodiment, the slope is 90 degrees, which indicates two possible values, $V_{C1\_H}$ and $V_{C1\_L}$, for link voltage $V_{C1}$. In other embodiments, the slope is less than 90 degrees and indicates multiple values of link voltage $V_{C1}$ between high link voltage $V_{C1\_H}$ and the low link voltage $V_{C1\_L}$. The shape of transition 1002 can be linear or nonlinear.

Figure 12:
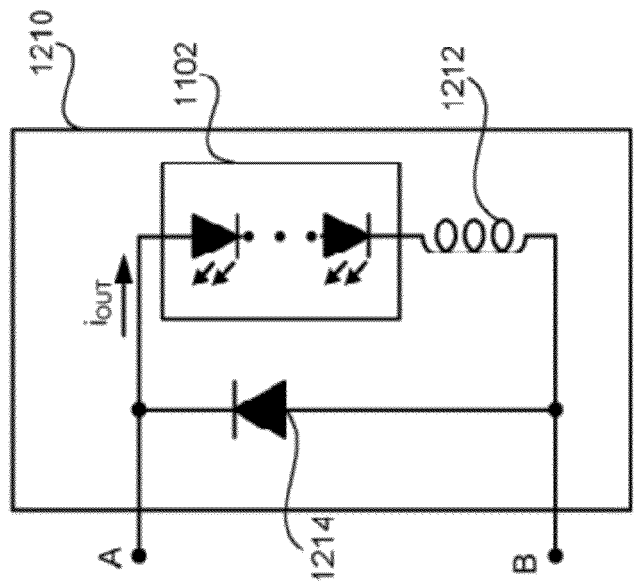
FIGS. 11 and 12 depict LED apparatuses.
Figure 11:
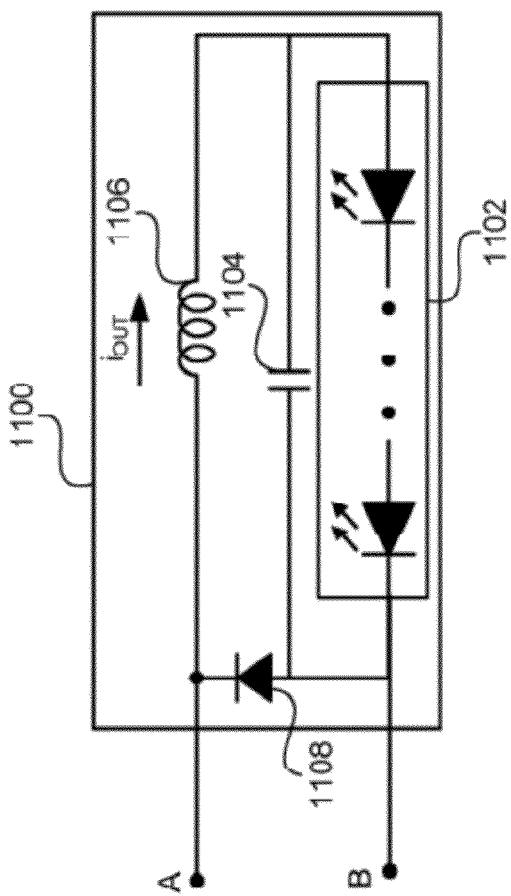

FIGS. 11 and 12 depict exemplary embodiments of LED apparatus 322. LED apparatus 1100 includes one or more LED(s) 1102. The LED(s) 1102 can be any type of LED including white, amber, other colors, or any combination of LED colors. Additionally, the LED(s) 1102 can be configured into any type of physical arrangement, such as linearly, circular, spiral, or any other physical arrangement. In at least one embodiment, each of LED(s) 1102 is serially connected. Capacitor 1104 is connected in parallel with LED(s) 1102 and provides filtering to protect the LED(s) 1102 from AC signals. Inductor 1106 smoothes energy from LED current $i_{OUT}$ to maintain an approximately constant current $i_{OUT}$ when PFC switch 306 is ON. Diode 1108 allows continuing current flow when switch PFC 306 is OFF.

In switching LED system 1210, inductor 1212 is connected in series with LED(s) 1102 to provide energy storage and filtering. Inductor 1212 smoothes energy from LED current $i_{OUT}$ to maintain an approximately constant current $i_{OUT}$ when PFC switch 306 is ON. Diode 1214 allows continuing current flow when PFC switch 306 is OFF. Although two specific embodiments of LED apparatus 322 have been described, LED apparatus 322 can be any LED, array of LED(s), or any switching LED system.

Thus, a PFC controller 302 determines at least one power factor correction control parameter from phase delays of phase modulated signal $V_\Phi$.

In at least one embodiment, as a dimming level decreases, the PFC controller 302 decreases a duty cycle of PFC switch 306 in the PFC LED driver circuit 304 to cause the PFC LED driver circuit 304 to decrease the output current supplied to the LEDs. When the phase modulated signal $V_\Phi$ indicates a dimming level below a threshold value $\Phi_{TH}$, the PFC controller 302 maintains an approximately constant duty cycle of the PFC switch 306 to, for example, maintain switching efficiency without significantly sacrificing power factor correction.

In at least one embodiment, PFC controller 302 generates a PFC switch control signal $CS_2$ to cause the PFC LED driver circuit 304 to respond to decreasing dimming levels as indicated by a dimming signal, such as the phase modulated signal $V_\Phi$, without decreasing an effective resistance of the PFC LED driver circuit 304.

In at least one embodiment, the PFC controller 302 generates a duty cycle modulated PFC switch control signal $CS_1$ to control a regulated link voltage $V_{C1}$ of the PFC LED driver circuit 304 and decreases the link voltage $V_{C1}$ when a duty cycle of the PFC switch control signal $CS_1$ decreases to a value between zero and a duty cycle threshold value $DC_{TH}$.

Although the present invention has been described in detail, it should be understood that various changes, substitutions and alterations can be made hereto without departing from the spirit and scope of the invention as defined by the appended claims.

What is claimed is:

1. A light emitting diode (LED) lighting system comprising:
    a power factor correction (PFC) controller comprising:
        an input to receive a phase delay signal indicating a phase delay of a phase modulated dimmer signal; and
        a digital signal processor, coupled to the input, to receive the phase delay signal and determine a PFC control operating parameter from the phase delay signal and to generate a PFC switch control signal using the determined operating parameter.

2. The LED lighting system of claim 1 further comprising:
a time-based phase delay detector to detect the phase delay of the phase modulated signal and generate the phase delay signal as a digital signal.

3. The LED lighting system of claim 1 wherein the digital signal processor is further configured to execute a control signal state algorithm to determine a pulse width of the PFC switch control signal.

4. The LED lighting system of claim 1 wherein the operating parameter is a peak voltage of the phase modulated dimmer signal.

5. The LED lighting system of claim 1 wherein the phase delay signal indicates a dimming level and the PFC controller is further configured to generate a PFC switch control signal to cause a PFC LED driver circuit to respond to the dimming level indicated by the signal without decreasing an effective resistance of the PFC LED driver circuit, as perceived by a voltage source of the PFC LED driver circuit, as the dimming level indicated by the signal increases.

6. The LED lighting system of claim 1 wherein the PFC controller is further configured to generate a duty cycle modulated control signal to control a regulated link voltage of a PFC LED driver circuit and to decrease the link voltage when a duty cycle of the control signal decreases to a value between zero and a duty cycle threshold value.

7. The LED lighting system of claim 1 wherein the PFC controller is further configured to generate approximately constant pulse widths for the PFC switch control signal during each cycle of phase modulated signal when a duty cycle of PFC switch control signal is below a predetermined threshold.

8. The LED lighting system of claim 1 wherein the PFC controller is further configured to generate pulses for the PFC switch control signal during the phase delays of the phase modulated signal, wherein the pulse widths and duty cycles of the pulses of the PFC switch control signal generated during the phase delays are sufficient to attenuate ripple of the phase modulated signal during the phase delays of phase modulated signal.

9. The LED lighting system of claim 8 wherein the pulses of PFC switch control signal generated during the phase delays have a period significantly greater than a period of the pulses of the PFC switch control signal during an active period of phase modulated signal.

10. A method of controlling a light emitting diode (LED) lighting system, the method comprising:
receiving a phase delay signal indicating a phase delay of a phase modulated dimmer signal;
determining a PFC control operating parameter from the phase delay signal using a digital signal processor; and
generating a PFC switch control signal using the determined operating parameter.

11. The method of claim 10 further comprising:
detecting the phase delay of the phase modulated signal using a time-based phase delay detector; and
generating the phase delay signal as a digital signal.

12. The method of claim 10 further comprising:
executing a control signal state algorithm to determine a pulse width of the PFC switch control signal.

13. The method of claim 10 wherein the operating parameter is a peak voltage of the phase modulated dimmer signal.

14. The method of claim 10 wherein the phase delay signal indicates a dimming level, the method further comprising:
generating a power factor correction control signal to cause a PFC LED driver circuit to respond to the dimming level indicated by the signal without decreasing an effective resistance of the PFC load driver circuit, as perceived by a voltage source of the PFC load driver circuit, as the dimming level indicated by the signal increases.

15. The method of claim 10 further comprising:
generating a duty cycle modulated control signal to control a regulated link voltage of a PFC LED driver circuit; and
decreasing the link voltage when a duty cycle of the control signal decreases to a value between zero and a duty cycle threshold value.

16. The method of claim 10 further comprising:
generating approximately constant pulse widths for the PFC switch control signal during each cycle of phase modulated signal when a duty cycle of PFC switch control signal is below a predetermined threshold.

17. The method of claim 10 further comprising:
generating pulses for the PFC switch control signal during the phase delays of the phase modulated signal, wherein the pulse widths and duty cycles of the pulses of the PFC switch control signal generated during the phase delays are sufficient to attenuate ripple of the phase modulated signal during the phase delays of phase modulated signal.

18. The method of claim 17 wherein the pulses of PFC switch control signal generated during the phase delays have a period significantly greater than a period of the pulses of the PFC switch control signal during an active period of phase modulated signal.

19. A light emitting diode (LED) lighting system comprising:
a power factor correction (PFC) controller to receive a signal indicating a dimming level and to generate a PFC switch control signal to cause a PFC LED driver circuit to respond to the dimming level indicated by the signal without decreasing an effective resistance of the PFC load driver circuit, as perceived by a voltage source of the PFC load driver circuit, as the dimming level indicated by the signal increases.

20. The lighting system of claim 19 wherein the PFC controller is further configured to decrease a duty cycle of the PFC switch control signal as the dimming level decreases until the dimming level reaches a dimming level threshold and to keep the duty cycle of the PFC switch control signal approximately constant for dimming levels below the dimming level threshold.

21. The lighting system of claim 19 wherein the PFC controller is further configured to increase the effective resistance of the PFC load driver circuit as the dimming level indicated by the dimming signal decreases.

22. A method of controlling a light emitting diode (LED) lighting system, the method comprising:
receiving a signal indicating a dimming level; and
generating a power factor correction control signal to cause a PFC LED driver circuit to respond to the dimming level indicated by the signal without decreasing an effective resistance of the PFC load driver circuit, as perceived by a voltage source of the PFC load driver circuit, as the dimming level indicated by the signal increases.

23. The method of claim 22 further comprising:
  decreasing a duty cycle of the PFC switch control signal as the dimming level decreases until the dimming level decreases to a dimming level threshold; and
  keeping the duty cycle of the PFC switch control signal approximately constant for dimming levels below the dimming level threshold.

24. The method of claim 22 further comprising:
  increasing the effective resistance of the PFC load driver circuit as the dimming level indicated by the dimming signal decreases.

25. A light emitting diode (LED) lighting system comprising:
  a power factor correction (PFC) controller to generate a duty cycle modulated control signal to control a regulated link voltage of a PFC LED driver circuit and to decrease the link voltage when a duty cycle of the control signal decreases to a value between zero and a duty cycle threshold value.

26. The LED lighting system of claim 25 wherein the PFC LED driver circuit is configured to operate from a mains voltage, and the PFC controller is configured to decrease the link voltage to approximately equal to the mains voltage.

27. The LED lighting system of claim 25 wherein the duty cycle threshold value is a member of the group consisting of 0.5 and between 0.25 and 0.5.

28. A method of controlling a light emitting diode (LED) lighting system, the method comprising:
  generating a duty cycle modulated control signal to control a regulated link voltage of a PFC LED driver circuit; and
  decreasing the link voltage when a duty cycle of the control signal decreases to a value between zero and a duty cycle threshold value.

29. The method of claim 28 wherein the PFC LED driver circuit is configured to operate from a mains voltage, the method further comprising:
  decreasing the link voltage to approximately equal to the mains voltage.

30. The method of claim 28 wherein the duty cycle threshold value is a member of the group consisting of 0.5 and between 0.25 and 0.5.

31. A light emitting diode (LED) lighting system comprising:
  a power factor correction (PFC) controller comprising:
    an input to receive a phase delay signal indicating a phase delay of a phase modulated dimmer signal; and
    wherein the PFC controller is configured to receive the phase delay signal and to generate pulses for the PFC switch control signal during the phase delays of the phase modulated signal, wherein the pulse widths and duty cycles of the pulses of the PFC switch control signal generated during the phase delays are sufficient to attenuate ripple of the phase modulated signal during the phase delays of phase modulated signal.

32. A method of controlling a light emitting diode (LED) lighting system, the method comprising:
  receiving a phase delay signal indicating a phase delay of a phase modulated dimmer signal;
  generating pulses for a PFC switch control signal during the phase delays of the phase modulated signal, wherein the pulse widths and duty cycles of the pulses of the PFC switch control signal generated during the phase delays are sufficient to attenuate ripple of the phase modulated signal during the phase delays of phase modulated signal.

* * * * *